US012774799B2

(12) United States Patent
Yoshida et al.

(10) Patent No.: US 12,774,799 B2
(45) **Date of Patent: *Oct. 27, 2026**

(54) LIGHT SOURCE DEVICE

(71) Applicant: NICHIA CORPORATION, Anan (JP)

(72) Inventors: Norimasa Yoshida, Komatsushima (JP); Tsuyoshi Okahisa, Tokushima (JP)

(73) Assignee: NICHIA CORPORATION, Anan (JP)

(*) Notice: Subject to any disclaimer, the term of this patent is extended or adjusted under 35 U.S.C. 154(b) by 359 days.

This patent is subject to a terminal disclaimer.

(21) Appl. No.: 18/499,719

(22) Filed: Nov. 1, 2023

(65) Prior Publication Data

US 2024/0060619 A1 Feb. 22, 2024

Related U.S. Application Data

(63) Continuation of application No. 18/295,007, filed on Apr. 3, 2023, now Pat. No. 11,846,412, which is a
(Continued)

(30) Foreign Application Priority Data

Jan. 23, 2020 (JP) ................................ 2020-009416
Feb. 21, 2020 (JP) ................................ 2020-028320
Sep. 1, 2020 (JP) ................................ 2020-147019

(51) Int. Cl.
*F21V 5/08* (2006.01)
*F21V 5/00* (2018.01)
(Continued)

(52) U.S. Cl.
CPC .............. *F21V 5/007* (2013.01); *F21V 5/045* (2013.01); *F21V 5/08* (2013.01); *F21V 33/0052* (2013.01);
(Continued)

(58) Field of Classification Search
CPC ............. F21V 5/045; F21V 5/007; F21V 5/08
See application file for complete search history.

(56) References Cited

U.S. PATENT DOCUMENTS 9,695,992 B2 7/2017 Schadt et al.
2007/0034890 A1 2/2007 Daschner et al.
(Continued)

FOREIGN PATENT DOCUMENTS

JP 2000-338557 A 12/2000
JP 2004-341107 A 12/2004
(Continued)

OTHER PUBLICATIONS

Non-Final Office Action in U.S. Appl. No. 17/153,646 dated Jul. 27, 2022.
(Continued)

*Primary Examiner* — Julie A Bannan
(74) *Attorney, Agent, or Firm* — Foley & Lardner LLP

(57) ABSTRACT

A light source device includes: a plurality of light emitting parts arranged in a matrix, each having an upper surface that includes a light emitting surface, each of the light emitting parts being configured to emit light from the light emitting surfaces and at least one of the light emitting parts being configured to be individually turned on, wherein: each of the light emitting parts includes: a light emitting element, a wavelength conversion member covering the upper surface of the light emitting element, and a light-reflective member covering lateral surfaces of the light emitting element wavelength conversion member, and the light-reflective members of the light-emitting parts are directly adjacent to each other; and an optical lens located above the light emitting surfaces of the light emitting parts, the optical lens including: a first surface including a plurality of incident regions, and a second surface including a plurality of emission regions.

14 Claims, 26 Drawing Sheets

Related U.S. Application Data continuation of application No. 17/153,646, filed on Jan. 20, 2021, now Pat. No. 11,649,945.

(51) Int. Cl.

| | |
|---|---|
| ***F21V 5/04*** | (2006.01) |
| ***F21V 33/00*** | (2006.01) |
| ***G02B 3/02*** | (2006.01) |
| ***H04N 23/56*** | (2023.01) |
| *F21Y 105/10* | (2016.01) |

(52) U.S. Cl.

CPC ............... *G02B 3/02* (2013.01); *H04N 23/56* (2023.01); *F21Y 2105/10* (2016.08)

(56) References Cited

U.S. PATENT DOCUMENTS

| | | | |
|---|---|---|---|
| 2013/0064531 | A1 | 3/2013 | Pillman et al. |
| 2013/0069084 | A1 | 3/2013 | Daschner et al. |
| 2013/0135856 | A1 | 5/2013 | Arai |
| 2014/0133142 | A1 | 5/2014 | Jorgensen |
| 2014/0226337 | A1 | 8/2014 | Timmers et al. |
| 2015/0204491 | A1 | 7/2015 | Yuan et al. |
| 2016/0312970 | A1 | 10/2016 | Suwa et al. |
| 2017/0059120 | A1 | 3/2017 | Kataoka |
| 2017/0184944 | A1 | 6/2017 | Butterworth |
| 2017/0249501 | A1 | 8/2017 | Van Der Sijde et al. |
| 2018/0051862 | A1 | 2/2018 | Meumann |
| 2018/0324343 | A1 | 11/2018 | Van Der Sijde et al. |
| 2019/0195456 | A1 | 6/2019 | Pfeffer et al. |
| 2019/0383465 | A1 | 12/2019 | Van Der Sijde et al. |
| 2020/0154027 | A1 | 5/2020 | Van Der Sijde et al. |
| 2020/0241391 | A1 | 7/2020 | Butterworth |
| 2020/0259987 | A1 | 8/2020 | Van Der Sijde et al. |

FOREIGN PATENT DOCUMENTS

| | | | |
|---|---|---|---|
| JP | 2005-259653 | A | 9/2005 |
| JP | 2007-049172 | A | 2/2007 |
| JP | 2012-164626 | A | 8/2012 |
| JP | 5275557 | B2 | 8/2013 |
| JP | 2014-517489 | A | 7/2014 |
| JP | 2014-530376 | A | 11/2014 |
| JP | 2015-090772 | A | 5/2015 |
| JP | 2016-045306 | A | 4/2016 |
| JP | 2017-521702 | A | 8/2017 |
| JP | 2019-502294 | A | 1/2019 |
| WO | WO-2012/020597 | A1 | 2/2012 |
| WO | WO-2015/087838 | A1 | 6/2015 |
| WO | WO-2018/130467 | A1 | 7/2018 |
| WO | WO-2018/225376 | A1 | 12/2018 |

OTHER PUBLICATIONS

Notice of Allowance in U.S. Appl. No. 17/153,646 dated Jan. 10, 2023.

Notice of Allowance in U.S. Appl. No. 18/295,007 dated Sep. 1, 2023.

Requirement for Restriction/Election in U.S. Appl. No. 17/153,646 dated Apr. 26, 2022.

LIGHT SOURCE DEVICE

CROSS-REFERENCE TO RELATED APPLICATIONS

This application is a continuation of U.S. patent application Ser. No. 18/295,007, filed on Apr. 3, 2023, which is a continuation of U.S. patent application Ser. No. 17/153,646, filed on Jan. 20, 2021 (now U.S. Pat. No. 11,649,945), which claims priority to Japanese Patent Application No. 2020-147019, filed on Sep. 1, 2020, Japanese Patent Application No. 2020-028320, filed on Feb. 21, 2020, and Japanese Patent Application No. 2020-009416, filed on Jan. 23, 2020. The contents of these application are hereby incorporated by reference in their entireties.

BACKGROUND

The present disclosure relates to a light source device.

Recently, light sources including a plurality of light emitting parts, such as light emitting diodes, have been used widely. For example, Japanese Patent No. 5275557 B1 describes a light source that can be used for a flash for a small camera, such as a camera incorporated in a mobile phone.

SUMMARY

Such a light source for use in, for example, a flash for a camera, must irradiate a desired irradiation region with a sufficient amount of light, among individual irradiation regions demarcated from the whole irradiation area.

In view of this, one object of the present disclosure is to provide a light source device that can irradiate a desired irradiation region with a sufficient amount of light.

A light source device according to one embodiment of the present disclosure includes: a plurality of light emitting parts, each having an upper surface and a light emitting surface in the upper surface, each of the light emitting parts being configured to emit light from the light emitting surface at a first full-width half-maximum and being configured to be individually turned on; a first lens covering the light emitting surfaces of the plurality of light emitting parts; and an optical lens located above the light emitting surfaces of the light emitting parts, the optical lens including: a first surface located at a light emitting surface side of the light emitting part, the first surface including a plurality of incident regions each corresponding to a respective one of the light emitting parts such that a light emitted from each of the plurality light emitting parts is incident on a respective one of the plurality of incident regions, and a second surface located on an opposite side to the first surface, the second surface including a plurality of emission regions each corresponding to a respective one of the plurality of incident regions. A minimum distance between the first surface of the optical lens and the first lens is 0.1 mm or more and 1.0 mm or less. A light emitted from each of the light emitting parts enters the optical lens through the first lens, the light being emitted from the first lens at a second full-width half-maximum smaller than the first full-width half-maximum, such that lights emitted from two or more of the light emitting parts are irradiated to two or more corresponding irradiation regions.

A light source device according to another embodiment of the present disclosure includes: a plurality of light emitting parts, each having an upper surface and a light emitting surface in the upper surface, each of the light emitting parts being configured to emit light from the light emitting surfaces at a first full-width half-maximum and being configured to be individually turned on; a first lens covering the light emitting surfaces of the plurality of light emitting parts; and an optical lens located above the light emitting surfaces of the light emitting parts, the optical lens including: a first surface including a plurality of incident regions, and a second surface including a plurality of emission regions. A minimum distance between the first surface of the optical lens and the first lens is 0.1 mm or more and 1.0 mm or less. A light emitted from each of the light emitting parts enters the optical lens through the first lens, the light being emitted from the first lens at a second full-width half-maximum smaller than the first full-width half-maximum, such that lights emitted from two or more of the light emitting parts are irradiated to two or more corresponding irradiation regions.

A light source device according to still another embodiment of the present disclosure includes: a plurality of light emitting parts arranged in a matrix, each of plurality of light emitting parts having an upper surface and a light emitting surface in the upper surface, each of the light emitting parts being configured to emit light from the light emitting surface at a first full-width half-maximum and being configured to be individually turned on; a first lens covering the light emitting surfaces of the plurality of light emitting parts and an optical lens located above the light emitting surfaces of the light emitting parts, the optical lens including a first surface including a plurality of incident regions and a second surface including a plurality of emission regions. A light emitted from each of the light emitting parts enters the optical lens through the first lens, the light being emitted from the first lens at a second full-width half-maximum smaller than the first full-width half-maximum. The first lens comprises a plurality of first unit lenses, each first unit lens being provided for a respective one of the plurality of light emitting parts. The optical axis of at least one of the plurality of first unit lens tilts with respect to the optical axis of the optical lens by an angle $\gamma$. The angle $\gamma$ is expressed by the formula $$\gamma = \tan^{-1}\left(\frac{x}{L} \times \tan\left(\frac{\alpha}{2}\right)\right),$$

where L ($0<L$) is a minimum distance between the optical axis of the optical lens and a center of the light emitting surface of the light emitting part disposed at a corner of the matrix, x ($0<x\leq L$) is a minimum distance between the optical axis of the optical lens and a center of the light emitting surface of the light emitting part covered with the first unit lens having the tilted optical axis, and $\alpha$ ($0°<\alpha<180°$) is an angle formed by a straight line connecting a central point and one point of two points that are located at two diagonal corners of an area including all the irradiation regions, and a straight line connecting the central point and the other point of the two points when the center point is an intersection of a plane in which the light emitting surfaces of the plurality of light emitting parts extend and the optical axis of the optical lens, such that lights emitted from two or more of the light emitting parts are irradiated to two or more corresponding irradiation regions.

The light source device according to certain embodiments of the present disclosure can irradiate the desired irradiation region with a sufficient amount of light.

DETAILED DESCRIPTION

Figure 1:
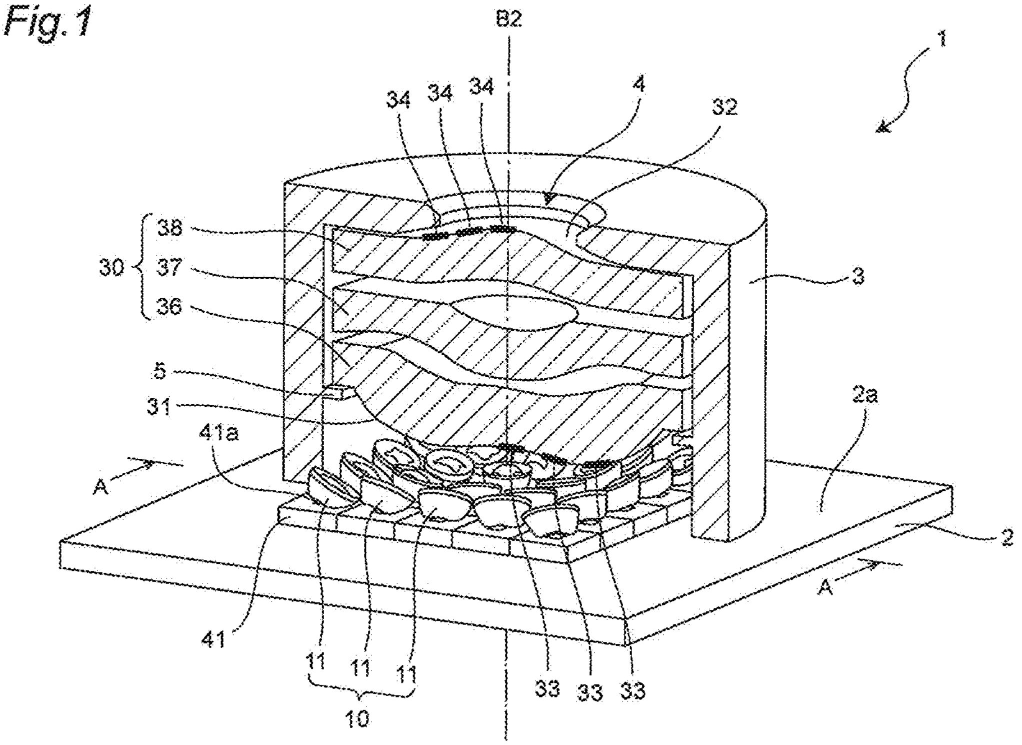
FIG. 1 is a schematic perspective view of a light source for a flash according to a first embodiment of the present disclosure.

Hereinafter, embodiments and examples according to the present disclosure will be described below with reference to the drawings. A light source for a flash described below, which is an example of a light source device according to the present disclosure, is intended to embody the technical ideas of the invention according to the present disclosure. However, the scope of the invention is not limited to the described embodiments and examples unless otherwise specified.

In the drawings, members having an identical function may be denoted by an identical reference character. In consideration of ease of explanation or understanding of the gist of the present invention, a plurality of embodiments or examples will be described for convenience, and configurations described in different embodiments or examples can be partially interchanged or combined. In the embodiments and examples that will be described below, repeated description of previously described elements may be omitted, and only the differences may be described. In particular, similar operations and similar effects obtained from similar configurations will not be mentioned for each embodiment or example. In the drawings, the sizes and positional relationships among members may be exaggerated for the sake of clarity.

With a light source, for example, for a camera flash, the greater the number of individual irradiation regions into which the whole irradiation area is demarcated, the more finely an irradiation region irradiated with light and an irradiation region not irradiated with light can be distinguished from each other, which allows for obtaining a photograph showing a subject more clearly.

However, when the number of divisions is increased to divide the whole irradiation area into detailed irradiation regions, the area of each individual irradiation region is reduced, so that light emitted from each light emitting part is not easily condensed on a desired irradiation region using an optical lens (for example, a camera lens), resulting in difficulty in irradiating the desired irradiation region with a sufficient amount of light. The inventors have made intensive studies to solve this problem.

As a result, the inventors have found that, using another lens in addition to the optical lens, the full-width half-maximum (directional full-width half-maximum) of the light emitted from each light emitting part is made narrower, causing the light to have directivity, especially, a predetermined directivity with respect to the direction toward the desired irradiation region, and to enter the optical lens thereafter, which allows or irradiating the desired irradiation region with a sufficient amount of light.

A light source device according to an embodiment of the present disclosure has been made in view of the findings described above, so as to irradiate two or more irradiation regions with light. The light source device includes: a plurality of light emitting parts, each having an upper surface and a light emitting surface in the upper surface, each of the light emitting parts being configured to emit light from the light emitting surface at a first full-width half-maximum and being configured to be individually turned on; a first lens covering the light emitting surfaces of the plurality of light emitting parts; and an optical lens located above the light emitting surfaces of the light emitting parts, the optical lens including: a first surface located at a light emitting surface side of the light emitting part, the first surface including a plurality of incident regions each corresponding to a respective one of the light emitting parts such that a light emitted from each of the plurality light emitting parts is incident on a respective one of the plurality of incident regions, and a second surface located on an opposite side to the first surface, the second surface including a plurality of emission regions each corresponding to a respective one of the plurality of incident regions. A minimum distance between the first surface of the optical lens and the first lens is 0.1 mm or more and 1.0 mm or less. A light emitted from each of the light emitting parts enters the optical lens through the first lens, the light being emitted from the first lens at a second full-width half-maximum smaller than the first full-width half-maximum, such that lights emitted from two or more of the light emitting parts are irradiated to two or more corresponding irradiation regions.

A light source device according to another embodiment of the present disclosure also has been made in view of the findings described above, so as to irradiate two or more irradiation regions with light. The light source device includes: a plurality of light emitting parts, each having an upper surface and a light emitting surface in the upper surface, each of the light emitting parts being configured to emit light from the light emitting surfaces at a first full-width half-maximum and being configured to be individually turned on; a first lens covering the light emitting surfaces of the plurality of light emitting parts; and an optical lens located above the light emitting surfaces of the light emitting parts, the optical lens including: a first surface including a plurality of incident regions, and a second surface including a plurality of emission regions. A minimum distance between the first surface of the optical lens and the first lens is 0.1 mm or more and 1.0 mm or less. A light emitted from each of the light emitting parts enters the optical lens through the first lens, the light being emitted from the first lens at a second full-width half-maximum smaller than the first full-width half-maximum, such that lights emitted from two or more of the light emitting parts are irradiated to two or more corresponding irradiation regions.

A light source device according to another embodiment of the present disclosure also has been made in view of the findings described above, so as to irradiate two or more irradiation regions with light. The light source device includes: a plurality of light emitting parts arranged in a matrix, each of plurality of light emitting parts having an upper surface and a light emitting surface in the upper surface, each of the light emitting parts being configured to emit light from the light emitting surface at a first full-width half-maximum and being configured to be individually turned on; a first lens covering the light emitting surfaces of the plurality of light emitting parts and an optical lens located above the light emitting surfaces of the light emitting parts, the optical lens including a first surface including a plurality of incident regions and a second surface including a plurality of emission regions. A light emitted from each of the light emitting parts enters the optical lens through the first lens, the light being emitted from the first lens at a second full-width half-maximum smaller than the first full-width half-maximum. The first lens comprises a plurality of first unit lenses, each first unit lens being provided for a respective one of the plurality of light emitting parts. The optical axis of at least one of the plurality of first unit lens tilts with respect to the optical axis of the optical lens by an angle $\gamma$. The angle $\gamma$ is expressed by the formula $$\gamma = \tan^{-1}\left(\frac{x}{L} \times \tan\left(\frac{\alpha}{2}\right)\right),$$

where L (0<L) is a minimum distance between the optical axis of the optical lens and a center of the light emitting surface of the light emitting part disposed at a corner of the matrix, x (0<x≤L) is a minimum distance between the optical axis of the optical lens and a center of the light emitting surface of the light emitting part covered with the first unit lens having the tilted optical axis, and $\alpha$ (0°<$\alpha$<180°) is an angle formed by a straight line connecting a central point and one point of two points that are located at two diagonal corners of an area including all the irradiation regions, and a straight line connecting the central point and the other point of the two points when the center point is an intersection of a plane in which the light emitting surfaces of the plurality of light emitting parts extend and the optical axis of the optical lens, such that lights emitted from two or more of the light emitting parts are irradiated to two or more corresponding irradiation regions.

EMBODIMENTS

1. First Embodiment

Hereinafter, a light source for a flash will be described as an example of a light source device according to the present disclosure, with reference to the drawings.

A light source 1 for a flash according to the present embodiment is a light source configured to irradiate two or more irradiation regions with light emitted from light emitting parts. As used herein, the irradiation region is a region that is expanded radially outwardly with respect to a certain direction. In the present embodiment, two or more irradiation regions refer to individual regions whose centers are spaced apart from each other by a predetermined distance when two or more light emitting parts are individually turned on, and that have a predetermined size and are individually irradiated with light emitted from the respective light emitting parts. That is, the expression "two or more irradiation regions" does not refer to a single region irradiated with lights emitted from two or more light emitting parts, but refers to a plurality of regions individually irradiated with lights emitted from respective two or more light emitting parts. The light source 1 for a flash according to the present embodiment is provided with a plurality of light emitting parts corresponding to a plurality of irradiation regions onto which lights in different directions are to be irradiated, as will be described below. Thus, by selecting and turning on one or more of the plurality of light emitting parts, one or more desired irradiation regions can be irradiated with the light. As shown in FIG. 1, the light source 1 includes a substrate 2, twenty-five light emitting parts 41 disposed on an upper surface 2*a* of the substrate 2, a first lens 10, and an optical lens 30 located above the light emitting parts 41. The first lens 10 includes twenty-five first unit lenses 11, each corresponding to a respective one of light emitting part 41 and covering a light emitting surface 41*a* in an upper surface of each light emitting part 41. The optical lens 30 collects or projects the light emitted from each light emitting part 41 toward the corresponding irradiation region.

The optical lens 30 has a first surface 31 on a light emitting surface 41*a* side of the light emitting part 41 and a second surface 32 on an opposite side to the first surface 31. The first surface 31 includes a plurality of incident regions 33 each corresponding to a respective one of the light emitting parts 41 and onto each of which the light emitted from the respective light emitting part 41 is incident. The second surface 32 includes a plurality of emission regions 34 each corresponding to a respective one of the incident regions 33. The incident region 33 and the emission region 34 shown in the figure are exaggeratedly depicted to indicate the regions.

Light emitted from each of the light emitting parts 41 enters the optical lens 30 through the first lens 10, is then emitted from the optical lens 30, and is irradiated to a corresponding one of irradiation regions that correspond to respective light emitting parts 41.

In the present embodiment, a frame 3 that accommodates the twenty-five light emitting parts 41, the first lens 10, and the optical lens 30 is disposed on the upper surface 2*a* of the substrate 2.

For easy understanding of an internal structure of the light source 1, FIG. 1 shows the cross sections of the optical lens 30 and the frame 3 without illustration of portions of the optical lens 30 and portions of the frame 3.

As used herein, for example, the expression that the first unit lens 11 is provided "corresponding to" the light emitting part 41 means that a single first unit lens 11 is provided in a one-to-one relationship with a single light emitting part 41 so that the light emitted from the single light emitting part 41 enters the single first unit lens 11 and is then emitted from the single first unit lens 11 toward the optical lens 30. Also, for example, the emission region 34 "corresponding to" the incident region 33 refers to a region where light entering the optical lens 30 from a single incident region 33 is emitted to the outside of the optical lens 30, in other words, a region provided in a one-to-one relationship with the single incident region 33. Further, for example, the irradiation region "corresponding to" the light emitting part 41 refers to a region that is to be irradiated with the light emitted from a single light emitting part 41 and is provided in a one-to-one relationship with the single light emitting part 41.

Thus, the term "corresponding to" herein means the relationship between members, between regions, between a member and a region, and the like, that are associated with each other.

Arrangement of Light Emitting Parts

Figure 2A:
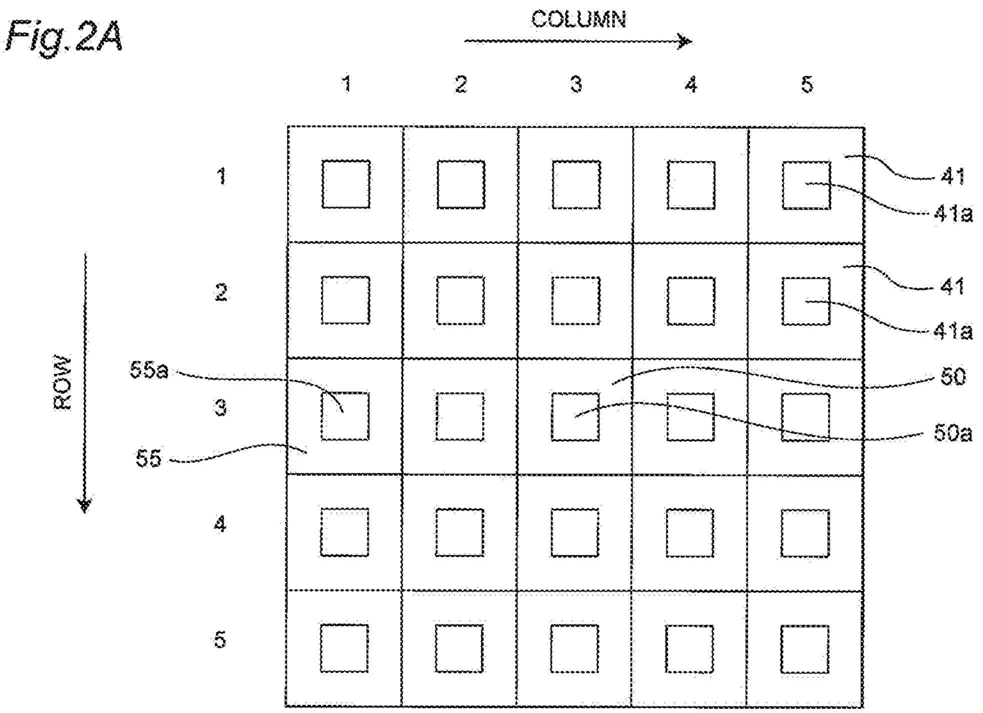
FIG. 2A is a schematic top view for explaining the arrangement of light emitting parts in the light source for a flash shown in FIG. 1.

As shown in FIG. 2A, the twenty-five light emitting parts 41 are arranged in a matrix of five rows and five columns. The light emitting part located at the center of the twenty-five light emitting parts 41 (the central light emitting part 50) is a light emitting part disposed in the third row and third column.

Figure 2B:
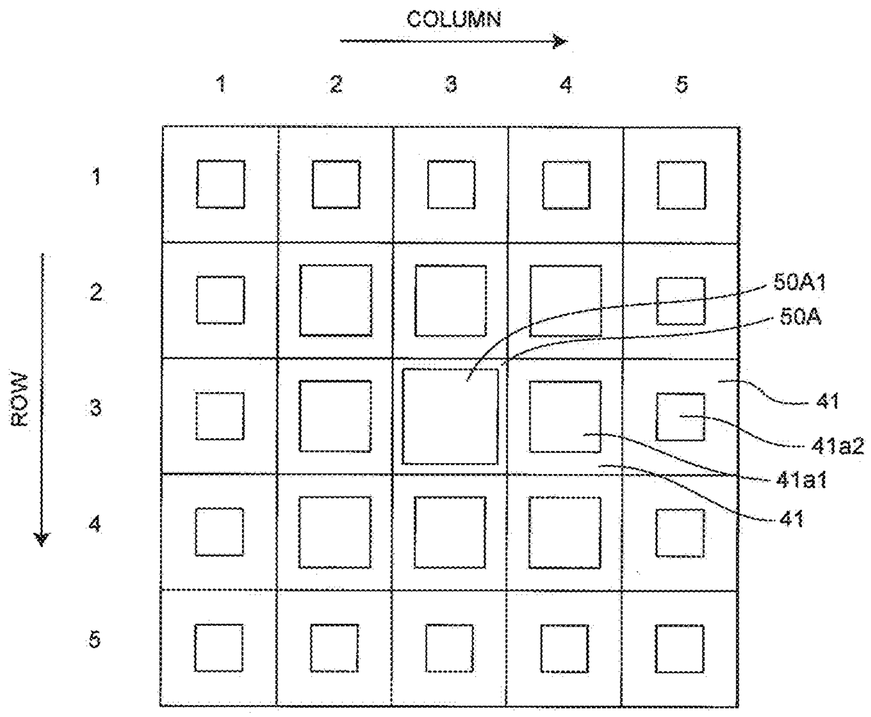
FIG. 2B is a schematic top view of light emitting parts that have light emitting surfaces with different sizes in the light source for a flash shown in FIG. 1.
Figure 2C:
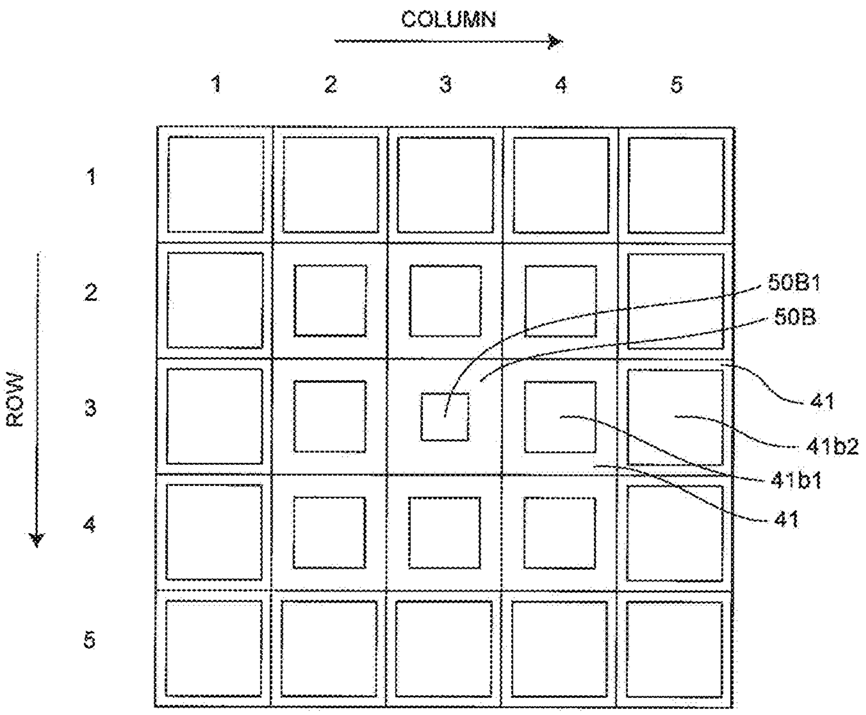
FIG. 2C is a schematic top view of light emitting parts that have light emitting surfaces with different sizes in the light source for a flash shown in FIG. 1.

In the present embodiment, each light emitting part 41 (including the central light emitting part 50) has a square shape in a top view, and adjacent light emitting parts 41 are disposed in contact with each other. The light emitting parts 41 may be in other appropriate shapes and arrangements. The light emitting part 41 may have a shape that is, for example, rectangular, circular, polygonal, etc., in a top view. For example, adjacent light emitting parts 41 may be disposed apart from each other. The light emitting surfaces 41*a* of the light emitting parts 41 may have similar shapes in the top view. For example, as shown in FIG. 2B, the size of the light emitting surfaces may be gradually reduced, like the light emitting surfaces 50A1, 41*a*1, and 41*a*2 in FIG. 2B, as the distance from a central light emitting part 50A increases. Alternatively, for example, as shown in FIG. 2C, the size of the light emitting surfaces may be gradually increased, for example, like the light emitting surfaces 50B1, 41*b*1, and 41*b*2 in FIG. 2C, as the distance from a central light emitting part 50B increases. That is, the size of the light emitting surface 41*a* of each light emitting part 41 may vary according to the location of the light emitting part 41 in the matrix arrangement. The farther the light emitting part 41 is disposed from the optical axis of the optical lens 30, the longer the distance to the corresponding irradiation region, the more difficult to control the light distribution, and the greater the loss of light tends to be. In view of this, with an arrangement in which the farther the light emitting part 41 is located from the central light emitting part 50B, the larger the light emitting surface of the light emitting part 41, for example, as in the light emitting surfaces 41*b*1 and 41*b*2 shown in FIG. 2C, the amount of light in the light emitting part 41 located far from the central light emitting part 50B can be increased, reducing the reduction in the brightness.

Furthermore, the number of light emitting parts 41 may be other than twenty-five, and it is sufficient to employ two or more light emitting parts 41. The arrangement of the plurality of light emitting parts 41 may be other than a matrix of m rows and m columns ($m \geq 2$), and, for example, may be a matrix of m rows and n columns ($m \geq 1$, $n \geq 2$, $m \neq n$), or may be a non-matrix arrangement. For example, four light emitting parts 41 are arranged in two rows and two columns, twelve additional light emitting parts 41 may be arranged around the four light emitting parts 41 on four sides to form a matrix such that four light emitting parts of the twelve additional light emitting parts 41 are disposed on each side of the four sides, and eight further additional light emitting parts 41 may be disposed around the twelve additional light emitting parts 41 on four sides such that two light emitting parts are disposed on each side of the four sides except for corners of the matrix. Thus, the plurality of light emitting parts 41 can be arranged in a shape close to a circle in a plan view. With such an arrangement of the plurality of light emitting parts 41, using the optical lens 30 having a circular shape in a plan view allows the lights from the plurality of light emitting parts 41 to be efficiently incident onto the optical lens 30. The distance between adjacent light emitting parts 41 or between adjacent light emitting surfaces 41*a* may be varied. That is, the distance between the two light emitting parts 41 or two light emitting surfaces 41*a* adjacent in the row direction may be shorter than the distance between the two light emitting parts 41 or the two light emitting surfaces 41*a* adjacent in the column direction.

Arrangement of Irradiation Regions

Figure 3:
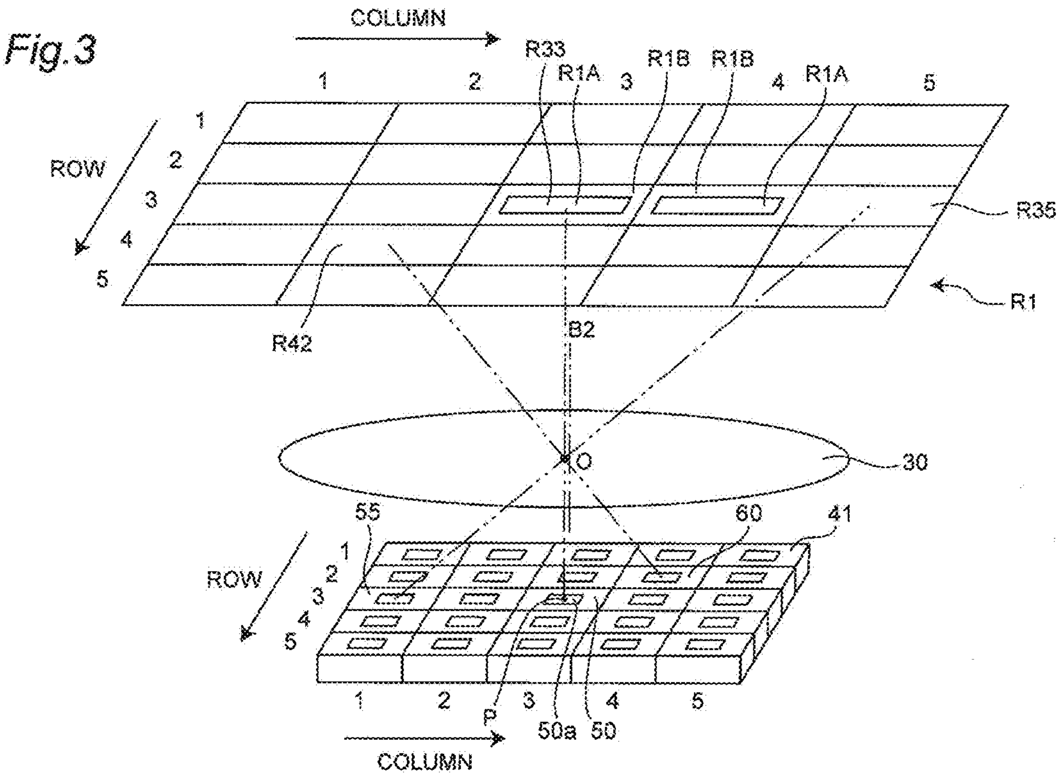
FIG. 3 is a schematic diagram for explaining the relationship between the light emitting part of the light source for a flash shown in FIG. 1 and an irradiation region corresponding to the light emitting part.

As shown in FIG. 3, the light source 1 according to the present embodiment is configured to irradiate light to an area R1, which is divided into twenty-five irradiation regions. The area R1 and each irradiation region shown in the drawings are schematically depicted two-dimensionally for ease of understanding of the contents of the invention, but can be actually a three-dimensional space. The twenty-five irradiation regions are arranged in a matrix with five rows and five columns. A single irradiation region corresponds to a single light emitting part 41 and is irradiated with light emitted from the corresponding light emitting part 41.

While the twenty-five irradiation regions are arranged in a matrix in the present embodiment, the irradiation regions may be arranged in any other appropriate arrangement. For example, any appropriate number of irradiation regions may be provided as long as two or more irradiation regions are provided. The number of irradiation regions is desirably the same as the number of light emitting parts 41. Furthermore, the arrangement of the plurality of irradiation regions may be other than a matrix of i rows and i columns (i≥2). The plurality of irradiation regions may be arranged in a matrix of i rows and j columns (i≥1, j≥2, i≠j) or may be in a non-matrix arrangement. The arrangement of the irradiation regions is desirably the same as the arrangement of the light emitting parts 41.

Arrangement Relationship between Light emitting part and Irradiation Region

In the present embodiment, as shown in FIG. 3, each light emitting part 41 and its corresponding irradiation region are arranged in a point-symmetric arrangement relationship with respect to a single point O located directly above a midpoint P of a light emitting surface 50*a* of the central light emitting part 50. That is, each light emitting part 41 and a respective one of the irradiation regions, each of the irradiation regions being to be irradiated with a light emitted from a respective one of the light emitting parts, have the point-symmetric arrangement relationship with respect to a single predetermined point for the corresponding light emitting part 41, such that the plurality of light emitting parts 41 and respective corresponding irradiation regions are in the point-symmetric arrangement relationship with respect to the same single predetermined point (the single point O). For example, the irradiation region R33, which is disposed in the third row and third column among the twenty-five irradiation regions, is the irradiation region corresponding to a central light emitting part 50 disposed in the third row and third column among the twenty-five light emitting parts 41. For example, the irradiation region R35, which is disposed in the third row and fifth column among the twenty-five irradiation regions, is the irradiation region corresponding to a light emitting part 55 disposed in the third row and first column among the twenty-five light emitting parts 41. For example, an irradiation region R42, which is disposed in the fourth row and second column among the twenty-five irradiation regions, is the irradiation region corresponding to a light emitting part 60 disposed in the second row and fourth column among the twenty-five light emitting parts 41.

As has been described above, the light emitting part 41 and the corresponding irradiation region are provided in a one-to-one relationship, which is not intended to include only a configuration in which light emitted from a single light emitting part 41 is irradiated to only the corresponding irradiation region. The "irradiation region corresponding to the light emitting part 41" refers to an irradiation region that is a target to which light emitted from the light emitting part 41 is to be irradiated. Therefore, in practice, an irradiation region adjacent to (or near) the irradiation region corresponding to a single light emitting part 41 can also be irradiated with the light emitted from the single light emitting part 41. In other words, as shown in FIG. 3, a single irradiation region may include a region (first irradiation region) R1A that is irradiated only with the light emitted from a corresponding light emitting part 41, and a region (second irradiation region) R1B that is irradiated with the light emitted from the corresponding light emitting part 41 and light emitted from a light emitting part 41 adjacent to (and/or near) the corresponding light emitting part 41. The single irradiation region may not include the first irradiation region R1A but may include only the second irradiation region R1B.

Each light emitting part 41 and its corresponding irradiation region are in the point-symmetric arrangement relationship with respect to the single point O in the description above, but may be in other appropriate arrangement relationship.

For example, the reference point for the point symmetry may be different for light emitting parts 41. That is, each irradiation region that is irradiated with light emitted from a corresponding light emitting part 41 and the corresponding light emitting part 41 are in the point-symmetric arrangement relationship with respect to a single predetermined point for the corresponding light emitting part 41. Furthermore, the single predetermined point is, for example, a single point on an optical axis B1 of each of the first unit lenses 11 corresponding to a corresponding one of the light emitting parts 41. Therefore, a light emitting part 41 and an irradiation region irradiated with light emitted from the light emitting part 41 may be in the point-symmetric arrangement relationship with respect to the single point located on the optical axis B1 of a corresponding first unit lens 11. The single point corresponding to each of the plurality of light emitting parts may be the same point.

For example, the reference point for the point symmetry (the single point O in the case of the present embodiment) may not be disposed directly above the midpoint P of the light emitting surface 50*a*.

Distribution of Light Emitted from Each Light Emitting Part

Next, referring to FIG. 1, a detailed description will be given on the distribution of light emitted from the light emitting part 41 and irradiated to a corresponding irradiation region.

Light emitted from the light emitting surface 41*a* of a light emitting part 41 at a first full-width half-maximum θ1 enters a corresponding one of the first unit lenses 11, so that a full-width half-maximum of the entered light is reduced to a second full-width half-maximum θ2 (θ1>θ2) by the first unit lent 11. The optical axis of each of the first unit lenses 11 is set to be parallel or tilted with respect to an optical axis B2 of the optical lens 30, which allows the light to have the directivity toward the corresponding irradiation region. The light emitted from the corresponding first unit lens 11 enters the optical lens 30 through a corresponding one of the incident regions 33, each corresponding to a respective one of light emitting parts 41. The light entered the optical lens 30 is emitted from a corresponding one of the emission regions 34, each corresponding to a respective one of the incident region 33, to the outside of the optical lens 30, and is irradiated to a corresponding irradiation region located, for example, at the position that is point-symmetric to the light emitting part 41 with respect to the single point O.

The single point O illustrated as an example is a point on the optical axis B2 of the optical lens 30, as will be described below. Accordingly, the light emitted from the central light emitting part 50 is emitted along the optical axis B2 of the optical lens 30, i.e., in a direction substantially parallel to the optical axis B2, and is irradiated to an irradiation region R33 located directly above the central light emitting part 50. Light emitted from light emitting parts other than the central light emitting part 50 travels intersecting the optical axis B2 of the optical lens 30, and then is irradiated to respective corresponding irradiation regions. The expression "along the optical axis of the optical lens" as used herein refers to, in particular, "through the optical axis of the optical lens."

In the present embodiment, a light emitting part 41 and its corresponding irradiation region are arranged at point-symmetric positions with respect to the single point O located directly above the central light emitting part 50. Thus, in the present embodiment, light emitted from the light emitting parts 41 other than the central light emitting part 50 intersect the optical axis B2 of the optical lens 30 to be irradiated to respective corresponding irradiation regions. However, a light emitting part 41 that emits the light that intersects the optical axis B2 of the optical lens 30 depends on the arrangement relationship between the light emitting parts 41 and the irradiation regions.

That is, in the present embodiment, lights emitted from the plurality of light emitting parts 41 intersect the optical axis B2 of the optical lens 30 or pass through the optical axis B2 of the optical lens 30 to irradiate the irradiation regions.

For the light source 1 according to the present embodiment, the shapes of the incident region 33 in the first surface 31 and the emission region 34 in the second surface 32 of the optical lens 30 are exemplified as one of the factors for irradiating irradiation regions with light emitted from corresponding light emitting parts 41. More specifically, refraction of light in the incident region 33 and refraction of the light in the emission region 34 causes light emitted from a light emitting part 41 to be irradiated to a corresponding irradiation region. This depends on the shape of the incident region 33 in the first surface 31 and the shape of the emission region 34 in the second surface 32.

The refraction of light in the incident region 33 and the refraction of light in the emission region 34 of the optical lens 30 are caused due to a difference between the refractive index of the optical lens 30 and the refractive index of a medium in contact with the optical lens 30. For this reason, a difference between the refractive index of the optical lens 30 and the refractive index of the medium in contact with the optical lens 30 is a parameter that is also to be considered when setting the shape of the first surface 31, including the incident regions 33, and the shape of the second surface 32, including the emission regions 34, of the optical lens 30. In the light source 1 according to the present embodiment, the medium in contact with the optical lens 30 is a space, in which, for example, the air is present. Therefore, in the present embodiment, the difference between the refractive index of the optical lens 30 and the refractive index of the medium in contact with the optical lens 30 is a difference in the refractive index between the optical lens 30 and the air.

Light enters the optical lens 30 through the first unit lens 11. Therefore, the light distribution characteristic of the first unit lens 11 is also a factor for irradiating the corresponding irradiation region with the light emitted from the light emitting part 41. More specifically, an emitting direction (directivity) of the light emitted from the first unit lens 11 is a factor for irradiating the corresponding irradiation region with the light emitted from the light emitting part 41. The emission direction determines the direction of the optical axis of each first unit lens 11.

Such irradiation of the corresponding irradiation region with the light emitted from the light emitting part 41 depends on the shapes of the first surface 31 and the second surface 32 of the optical lens 30. The difference between the refractive index of the optical lens 30 and the refractive index of the medium in contact with the optical lens 30 is also a parameter that can be set for determining the shape of the first surface 31 and the shape of the second surface 32 of the optical lens 30. Further, because light entering the optical lens 30 is light emitted from the first unit lens 11, an emitting direction of the light emitted from the first unit lens 11 can also be a parameter for determining the shape of the first surface 31 and the shape of the second surface 32 of the optical lens 30.

Thus, the shape of each of the incident region 33 and the emission region 34, which is one of the factors for irradiating the corresponding region with the light emitted from the light emitting part 41, is determined, for example, by simulation, in consideration of the parameters exemplified above.

Components of the light source will be described in detail below with reference to FIGS. 1, 4A and 5.

Substrate

The substrate 2 is a wiring substrate including connection electrodes on the upper surface 2*a*. Each of the connection electrodes is connected to a respective one of electrodes 44 of the light emitting parts 41, which will be described below.

Frame

Figure 4A:
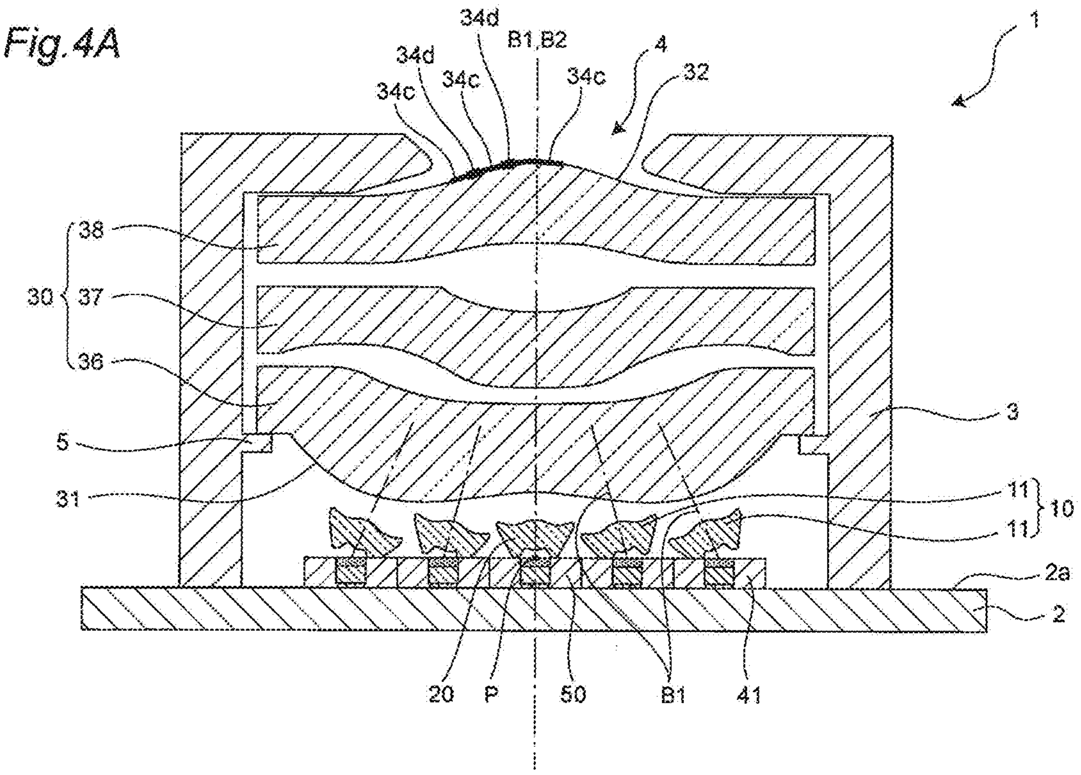
FIG. 4A is a schematic cross-sectional view taken along line A-A of the light source for a flash shown in FIG. 1.

As shown in FIGS. 1 and 4A, the frame 3 is disposed on the upper surface 2*a* of the substrate 2. The frame 3 is a member with a hollow interior and an opening in an upper portion that communicates with the hollow interior. The frame 3 preferably includes, at its inner surface, a light-absorbing member that does not reflect light. The light-absorbing member is formed of, for example, polycarbonate, silicone resin, polyphenylene sulfide (PPS), polyamide (PA), or liquid crystal plastic (LCP). The whole frame 3 may be made of the light-absorbing member. The light emitting parts 41, the first lens 10, and the optical lens 30 are disposed in the hollow interior of the frame 3.

The height between the upper surface 2*a* of the substrate 2 and a top surface of the frame 3 is in a range of, for example, 2.0 mm to 10.0 mm. With such a height between the upper surface 2*a* of the substrate 2 and the top surface of the frame 3, the light source device can be mounted incorporated in a small electronic device, such as a smartphone.

Light Emitting Part

Figure 5:
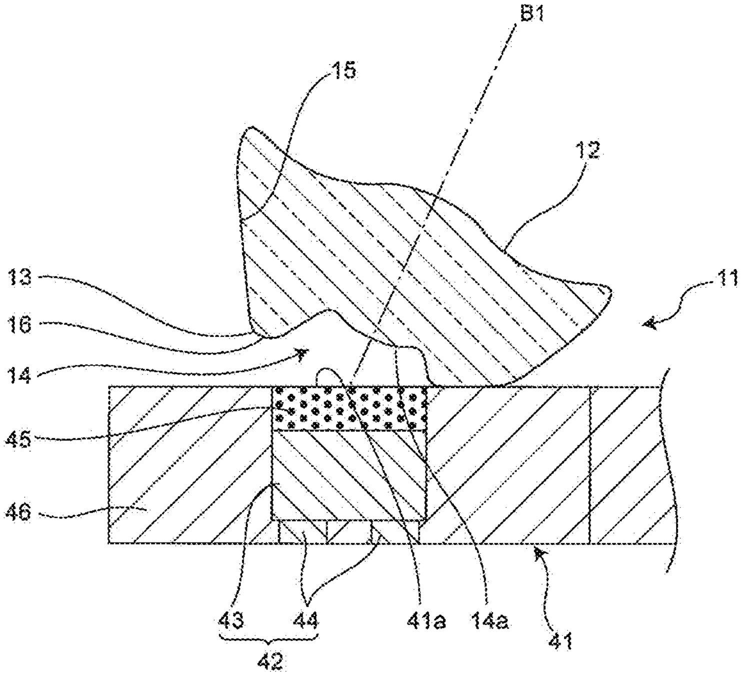
FIG. 5 is a schematic enlarged cross-sectional view of the light emitting part and a first lens shown in the cross-sectional view of FIG. 4A.

As shown in FIG. 5, each light emitting part 41 includes a light emitting element 42, a wavelength conversion member 45 covering an upper surface of the light emitting element 42, and an light-reflective member 46 covering lateral surfaces of the light emitting element 42 and lateral surfaces of the wavelength conversion member 45.

The light emitting element 42 has at least a semiconductor layered body 43 and electrodes 44 having two polarities (for example, a P-side electrode and an N-side electrode). The electrodes 44 are electrically connected to the connection electrodes of the substrate 2. When mounting in a face-down manner, the light emitting element 42 desirably emits light mainly from a surface of the light emitting element 42 opposite to a surface of the light emitting element 42 provided with the electrodes 44 (hereinafter may be referred to as an "upper surface of the light emitting element 42").

The light-reflective member 46 is formed of, for example, a white resin containing a light diffusing material such as titanium oxide. With the light-reflective member 46 covering the lateral surfaces of the light emitting element 42, the light emitted from the lateral surfaces of the light emitting element 42 can be reflected at the light-reflective member 46, to be emitted from the upper surface of the light emitting element 42. This allows for efficiently utilizing the light emitted from the light emitting element 42.

The wavelength conversion member 45 is formed of a silicone resin containing a phosphor or the like, for example. The upper surface of the wavelength conversion member 45 can serve as the light emitting surface 41*a* of the light emitting part 41. With the wavelength conversion member 45 covering the upper surface of the light emitting element 42, light in a desired wavelength range can be emitted from the light emitting surface 41*a* of the light emitting part 41.

The light emitting parts 41, each having a configuration described above, can be controlled to be turned on discretely from each other. That is, the plurality of light emitting parts 41 can be individually turned on.

First Lens

Figure 4B:
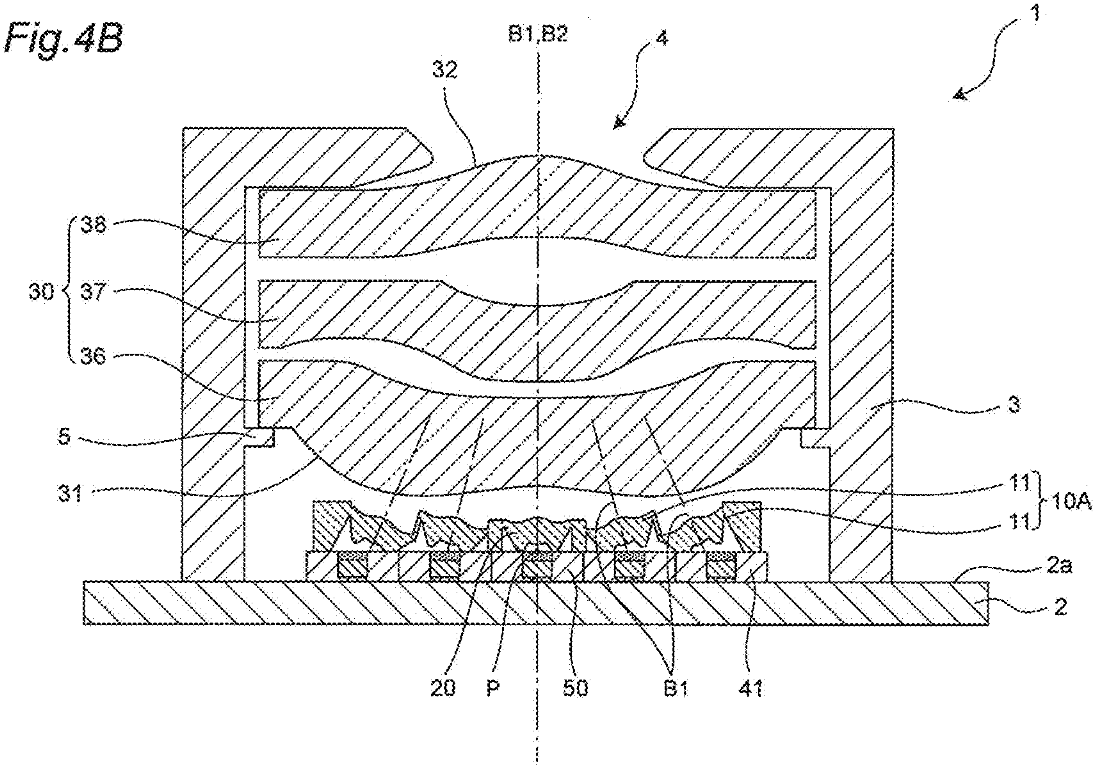
FIG. 4B is another schematic cross-sectional view taken along line A-A of the light source for a flash shown in FIG. 1 in a case in which first unit lenses form a monolithic first lens.

The first lens 10 is provided to reduce the full-width half-maximum of light emitted from the light emitting part 41 so that the emitted light has the directivity toward the corresponding irradiation region. The first lens 10 includes a plurality of first unit lenses 11, each first unit lens being provided for a respective one of the light emitting parts 41. The first lens 10 according to the present embodiment includes twenty-five first unit lenses 11, each first unit lens being provided for a respective one of the twenty-five light emitting parts 41. The first unit lenses 11 shown in FIG. 1 are provided separately from each other. However, the first unit lenses 11 may be connected to respective adjacent first unit lenses to be formed as a single monolithic member as shown in FIG. 4B. The first lens 10A having a structure in which the first unit lenses 11 are formed as a single monolithic body can be regarded as a single lens that collectively covers the light emitting surfaces 41*a* of the twenty-five light emitting parts 41 and that includes the twenty-five first unit lenses 11, each first unit lens being provided for a respective one of the light emitting parts 41.

For the first unit lens 11 in the present embodiment, a total internal reflection lens (TIR lens) is used. As used herein, the term "total internal reflection lens" refers to a lens configured to adjust the directivity of light by using total reflection inside the lens. As shown in FIG. 5, the total internal reflection lens used in the present embodiment has a lower surface 13 in which a recess 14 is defined and an upper surface 12 having a corrugated cross-sectional shape. The total internal reflection lens is a lens having a substantially conical trapezoidal shape that is tapered from the upper surface 12 to the lower surface 13. The total internal reflection lens used in the present embodiment has a rotationally symmetric shape about the optical axis B1.

The first unit lens 11, which is the total internal reflection lens, is disposed, such that the inner surface 14*a* defining the recess 14 is located above the light emitting surface 41*a* of the light emitting part 41 and covers the light emitting surface 41*a*. That is, the first unit lens 11 is disposed such that an opening end 16 of the recess 14 (i.e., a connection portion between the inner surface 14*a* of the recess 14 and the lower surface 13) is located outward of the outer periphery of the light emitting surface 41*a* in a top view.

Next, referring to FIGS. 1, 2A and 4A, the extending direction of the optical axis B1 of the first unit lens 11 will be described.

As shown in FIG. 2A, the first unit lenses 11 disposed corresponding to respective light emitting parts 41 arranged in a matrix with five rows and five columns are also arranged in a matrix of five rows and five columns. The optical axis B1 of at least one first unit lens 11 is tilted with respect to the optical axis B2 of the optical lens 30. In the present embodiment, as shown in FIGS. 1 and 4A, first unit lenses 11 other than the first unit lens (central first unit lens) 20 that is disposed on the central light emitting part 50 are disposed such that their respective optical axes B1 are tilted with respect to the optical axis B2 of the optical lens 30, which will be described below. As used herein, the "two optical axes are tilted" refers to that two optical axes intersect each other with an angle therebetween, that is, two optical axes are not parallel to each other. Tilt angles of the optical axes B1 of the first unit lenses 11 other than the central first unit lens 20 with respect to the optical axis B2 of the optical lens 30 are appropriately set according to the arrangement relationship between each light emitting part 41, where a respective first unit lens 11 is disposed, and a respective irradiation region that corresponds to the light emitting part 41. More specifically, the tilt angle is set such that the light emitted from a first unit lens 11 has the directivity toward a corresponding irradiation region, compared to a case in which no first unit lens 11 is disposed. Thus, the tilt angles for the plurality of first unit lenses 11 can be set to be different values according to the arrangement relationship between each light emitting part 41, where the first unit lens 11 is disposed, and a respective irradiation region that corresponds to the light emitting part 41.

As described above, in the present embodiment, the twenty-five light emitting parts 41 arranged in five rows and five columns and the irradiation regions corresponding to these light emitting parts have the point-symmetric arrangement relationship with respect to the single point O located above the central light emitting part 50.

Accordingly, (1) an optical axis of a first unit lens 11 disposed in the third row and the second column and an optical axis of a first unit lens 11 disposed in the third row and the fourth column are tilted at the same tilt angle (hereinafter referred to as a first angle) with respect to the optical axis B2 of the optical lens 30;

(2) an optical axis of a first unit lens 11 disposed in the second row and the third column and an optical axis of a first unit lens 11 disposed in the fourth row and the third column are tilted at the same tilt angle (hereinafter referred to as a second angle) with respect to the optical axis B2 of the optical lens 30;

(3) an optical axis of a first unit lens 11 disposed in the second row and the second column, an optical axis of a first unit lens 11 disposed in the second row and the fourth column, an optical axis of a first unit lens 11 disposed in the fourth row and the second column, and an optical axis of a first unit lens 11 disposed in the fourth row and the fourth column are tilted at the same tilt angle (hereinafter referred to as a third angle) with respect to the optical axis B2;

(4) an optical axis of a first unit lens 11 disposed in the third row and the first column and an optical axis of a first unit lens 11 disposed in the third row and the fifth column are tilted at the same tilt angle (hereinafter referred to as a fourth angle) with respect to the optical axis B2 of the optical lens 30;

(5) an optical axis of a first unit lens 11 disposed in the first row and the third column and an optical axis of a first unit lens 11 disposed in the fifth row and the third column are tilted at the same tilt angle (hereinafter referred to as a fifth angle) with respect to the optical axis B2 of the optical lens 30;

(6) an optical axis of a first unit lens 11 disposed in the second row and the first column, an optical axis of a first unit lens 11 disposed in the second row and the fifth column, an optical axis of a first unit lens 11 disposed in the fourth row and the first column, and an optical axis of a first unit lens 11 disposed in the fourth row and the fifth column are tilted at the same tilt angle (hereinafter referred to as a sixth angle) with respect to the optical axis B2 of the optical lens 30;

(7) an optical axis of a first unit lens 11 disposed in the first row and the second column, an optical axis of a first unit lens 11 disposed in the first row and the fourth column, an optical axis of a first unit lens 11 disposed in the fifth row and the second column, and an optical axis of a first unit lens 11 disposed in the fifth row and the fourth column are tilted at the same tilt angle (hereinafter referred to as a seventh angle) with respect to the optical axis B2 of the optical lens 30; and (8) an optical axis of a first unit lens 11 in the first row and the first column, an optical axis of a first unit lens 11 in the first row and the fifth column, an optical axis of a first unit lens 11 in the fifth row and the first column, and an optical axis of a first unit lens 11 in the fifth row and the fifth column are tilted at the same tilt angle (hereinafter referred to as an eighth angle) with respect to the optical axis B2 of the optical lens 30.

Moreover, when the light emitting part 41 has a square shape in a top view and light emitting surfaces 41*a* of the light emitting parts 41 have the same size, (a) the first angle and the second angle are the same;

(b) the fourth angle and the fifth angle are the same;

(c) the sixth angle and the seventh angle are the same;

(d) the third angle is set larger than each of the first angle and the second angle;

(e) each of the fourth angle and the fifth angel is set larger than each of the first angle and the second angle;

(f) each of the sixth angle and the seventh angle is set larger than each of the fourth angle and the fifth angle; and (g) the eight angle is set larger than each of the sixth angle and the seventh angle.

Figure 20:
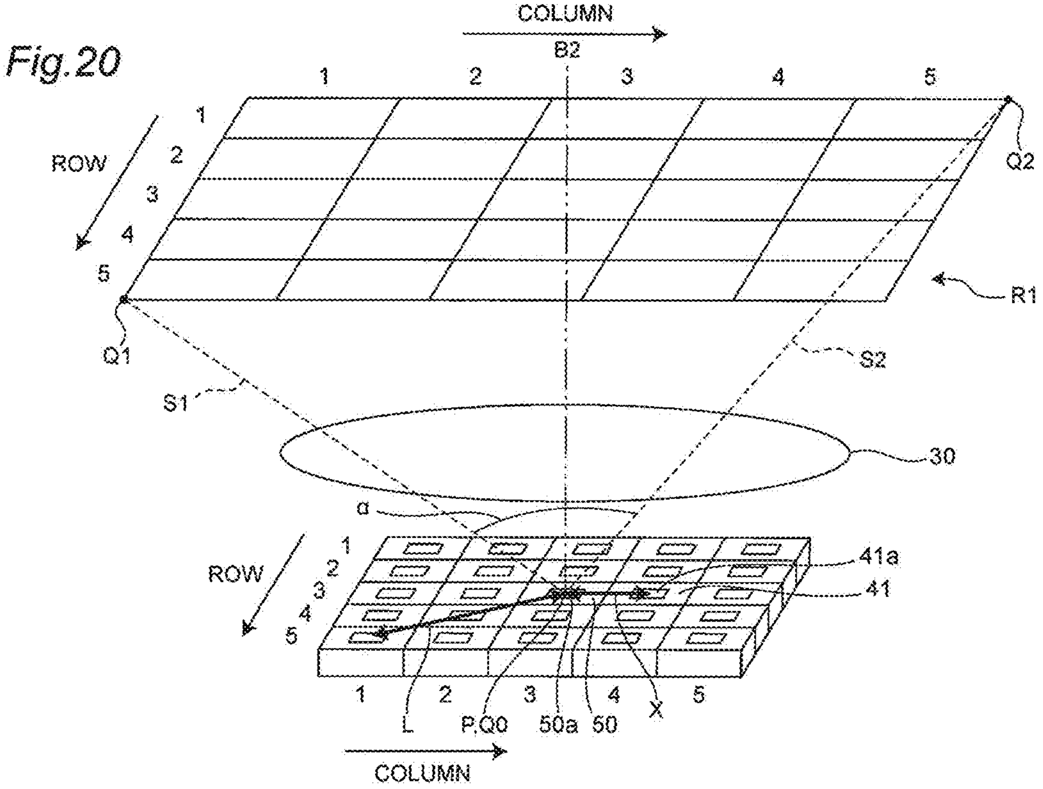
FIG. 20 is a diagram schematically showing the minimum distance L, the minimum distance x, and the angle $\alpha$ in the light source for a flash shown in FIG. 1.

Referring to FIG. 20, a description will be given on a specific method of calculating an angle γ (see FIG. 4C) at which the optical axis B1 of at least one first unit lens 11 is tilted with respect to the optical axis B2 of the optical lens 30 when the light emitting parts 41 are arranged in a matrix. In FIG. 20, illustration of the first unit lens 11 is omitted for ease of understanding of the figure.

When the light emitting parts 41 are arranged in a matrix, the angle γ can be calculated, for example, by Formula 1 given below, under the conditions of:

(a) L is defined as the minimum distance from the optical axis B2 of the optical lens 30 to the center of the light emitting surface 41*a* of the light emitting part 41 disposed at the corner of the matrix (0<L);

(b) x is defined as the minimum distance between the optical axis B2 of the optical lens 30 and the center of the light emitting surface 41*a* of a light emitting part 41 covered with a corresponding first unit lens 11 that has the optical axis B1 tilted with respect to the optical axis B2 (in an example shown in FIG. 20, the light emitting surface 41*a* of the light emitting part 41 disposed in the third row and the fourth column) (0<x≤L); and (c) when a central point Q0 is defined as an intersection of a plane in which the light emitting surfaces 41*a* of the plurality of light emitting parts 41 extend and the optical axis B2 of the optical lens 30 (in the example shown in FIG. 20, the midpoint P of the light emitting surface 50*a* of the central light emitting part 50), a is defined as an angle formed by a straight line S1 connecting the central point Q0 and one point Q1 of two points that are located at two diagonal corners of the area R1 (which is an area including all of the two or more irradiation regions), and a straight line S2 connecting the central point Q0 and the other point Q2 of the two points (0°<α<180°).

The term "light emitting part 41 located at a corner of the matrix" refers to one of light emitting parts located at four corners of the matrix. Thus, for example, when the light emitting parts 41 are arranged in the matrix of five rows and five columns, the "light emitting part 41 located at a corner of the matrix" can be the light emitting part 41 in the first row and the first column, the light emitting part 41 in the first row and the fifth column, the light emitting part 41 in the fifth row and first column, or the light emitting part 41 in the fifth row and the fifth column.

Formula 1

$$\gamma = \tan^{-1}\left(\frac{x}{L} \times \tan\left(\frac{\alpha}{2}\right)\right) \quad (1)$$

Optical Lens

As shown in FIG. 4A, the optical lens 30 is disposed above the light emitting parts 41, and collectively covers the twenty-five light emitting parts 41 and the first lens 10. The optical lens 30 according to the present embodiment is composed of a plurality of lenses, specifically, a first optical lens 36, a second optical lens 37, and a third optical lens 38, which are disposed in that order from a first lens 10 side. The first optical lens 36, the second optical lens 37, and the third optical lens 38 are arranged with spaces between respective adjacent lenses. Within the spaces, for example, air is present. The first optical lens 36, the second optical lens 37, and the third optical lens 38 are disposed to be supported and secured on the supporting portion 5 at their respective end portions, the supporting portion 5 being located on the inner lateral surface of the frame 3. In the accompanying drawings, illustration of a supporting portion that supports the second optical lens 37 and a supporting portion that supports the third optical lens 38 are omitted. The first optical lens 36, the second optical lens 37, and the third optical lens 38 are disposed with their optical axes coinciding with each other. Thus, the optical axis B2 of the optical lens 30 is specified as a single axis. In the present embodiment, the optical lens 30 is disposed such that its optical axis B2 is orthogonal to the upper surface 2*a* of the substrate 2 and passes through the midpoint P of the central light emitting part 50. Therefore, the single point O that determines the point-symmetric arrangement relationship between the light emitting part 41 and the corresponding irradiation region is located on the optical axis B2 of the optical lens 30.

The first optical lens 36, the second optical lens 37, and the third optical lens 38 may be supported using other appropriate configuration than the supporting portion 5 located on the inner lateral surface of the frame 3. For example, the first optical lens 36, the second optical lens 37, and the third optical lens 38 may be attached to a supporting rod provided on an inner upper surface of the frame 3 to be supported.

The optical lens 30 has a first surface 31 located on the light emitting surface 41*a* side of the light emitting part 41 and a second surface 32 on the opposite side to the first surface 31, i.e., located at the opening 4 side of the frame 3. As in the present embodiment, when the optical lens 30 includes the first optical lens 36, the second optical lens 37, and the third optical lens 38, a surface of the first optical lens 36 at a light emitting part 41 side is the first surface 31, and a surface of the third optical lens 38 at an opening 4 side of the frame 3 is the second surface 32.

The first surface 31 includes a plurality of incident regions 33 corresponding to respective light emitting parts 41 such that light emitted from each of the light emitting parts 41 is incident on a respective one of the light emitting parts 41. The second surface 32 includes a plurality of emission regions 34 corresponding to the respective plurality of incident regions 33.

As described above, distribution of light emitted from each light emitting part 41 depends on the shapes of the first surface 31 including the incident regions 33 and the second surface 32 including the emission regions 34 of the optical lens 30. In the present embodiment, the optical lens 30 is composed of three lenses, namely, the first optical lens 36, the second optical lens 37, and the third optical lens 38, which are spaced apart from each other with the air interposed therebetween. Therefore, the distribution of light between the incident region 33 and the emission region 34 can be influenced by a shape of a region of the first optical lens 36 (the emission region) from which light is emitted, the difference between the refractive index of the first optical lens 36 and the refractive index of the air, a shape of a region of the second optical lens 37 (the incident region) on which light is incident, a shape of a region of the second optical lens 37 (the emission region) from which light is emitted, the difference between the refractive index of the second optical lens 37 and the refractive index of the air, a shape of a region of the third optical lens 38 (the incident region) onto which light is incident, and the difference between the refractive index of the third optical lens 38 and the refractive index of the air. Thus, a shape of the incident region 33 and a shape of the emission region 34 are designed in consideration of these factors.

Figure 4C:
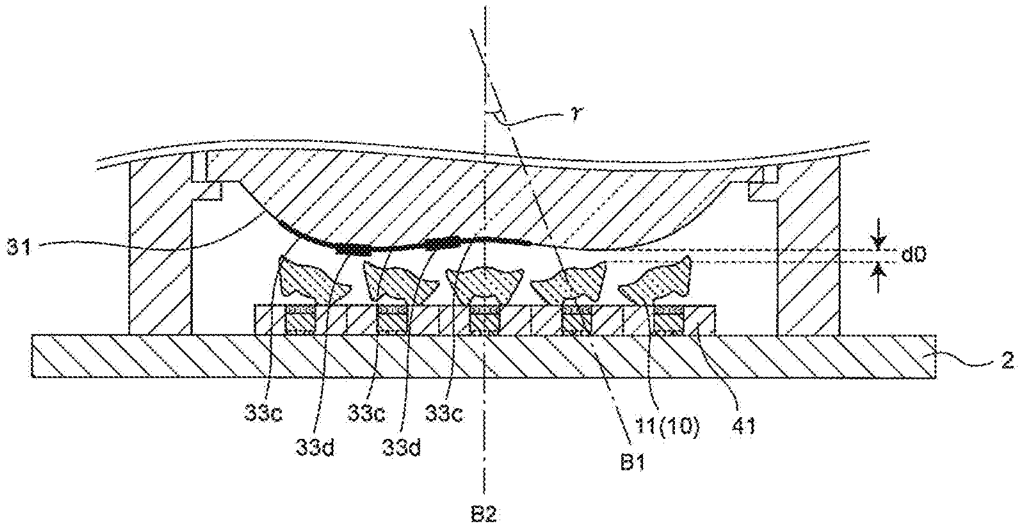
FIG. 4C is a schematic partially enlarged view of the cross-sectional view shown in FIG. 4A.

Incident regions 33 through which lights emitted from corresponding adjacent light emitting parts 41 enter the optical lens 30 may entirely or partially overlap each other, depending on the full-width half-maximum of the light emitted from corresponding first unit lenses 11, the distance from the first unit lenses 11 to the optical lens 30, the tilt angle of the optical axis B1 of the corresponding first unit lens 11 with respect to the optical axis B2 of the optical lens 30, and the like. Therefore, two adjacent incident regions 33 of the plurality of incident regions 33 of the optical lens 30 may entirely or partially overlap. In the present specification, in the incident regions 33, a region onto which only light emitted from a corresponding first unit lens 11 is incident is referred to as a "first incident region 33*c*," and a region overlapping the adjacent incident region 33 is referred to as a "second incident region 33*d*." The first incident regions 33*c* and the second incident regions 33*d* are shown in FIG. 4C. Therefore, each incident region 33 of the optical lens 30 may include the first incident region 33*c* on which the light emitted from a light emitting part 41 corresponding to the incident region 33 is incident, and the second incident region 33*d* on which light emitted from an adjacent light emitting section 41 light from the one light emitting part 41 are incident. Thus, each incident region 33 may not necessarily be designed discretely, but may be designed appropriately in relation to the adjacent incident region.

Similarly, emission regions 34 of the optical lens 30 through which lights entered the optical lens 30 from corresponding adjacent incident regions 33 are emitted may entirely or partially overlap each other, depending on the position of the corresponding incident region 33, the difference between the refractive index of the optical lens 30 and the refractive index of the medium in contact with the optical lens 30, the arrangement of the corresponding incident regions, and the like. Therefore, two adjacent emission regions 34 of the plurality of emission regions 34 of the optical lens 30 may entirely or partially overlap. In the present specification, in the emission regions 34, a region from which only light that has been emitted from a corresponding first unit lens 11 is emitted is referred to as a "first emission region 34*c*," and a region overlapping the adjacent emission region 34 is referred to as a second emission region 34*d*. The first emission regions 34*c* and the second emission regions 34*d* are shown in FIG. 4A. Therefore, each emission region 34 of the optical lens 30 may include the first emission region 34*c* from which light entering the optical lens 30 through a corresponding incident region 33 is emitted, and the second emission region 34*d* from which light entered the optical lens 30 from an adjacent incident region 33 and light entering through the corresponding incident region 33 are emitted. Thus, each emission region 34 may not necessarily be designed independently, but may be designed as appropriate in relation to the adjacent emission region 34.

A minimum distance d0 between the first surface 31 of the optical lens 30 and the first lens 10, shown in FIG. 4C, is, for example, 0.1 mm or more and 1.0 mm or less, and preferably 0.1 mm or more and 0.5 mm or less. The minimum distance d0 in the present embodiment refers to an interval between the first surface 31 of the optical lens 30 and the first lens 10 which are located closest to each other, regardless of the shape of the first surface 31 of the optical lens 30 and the shape of the first lens 10. With such a minimum distance d0 between the first surface 31 of the optical lens 30 and the first lens 10, the light source device can be mounted on a small electronic device, such as a smartphone.

Next, referring to FIGS. 6A to 7B, a detailed description will be given on the distribution of light emitted from each light emitting part 41.

Distribution of Light Emitted from Central Light Emitting Part 50

Figure 6A:
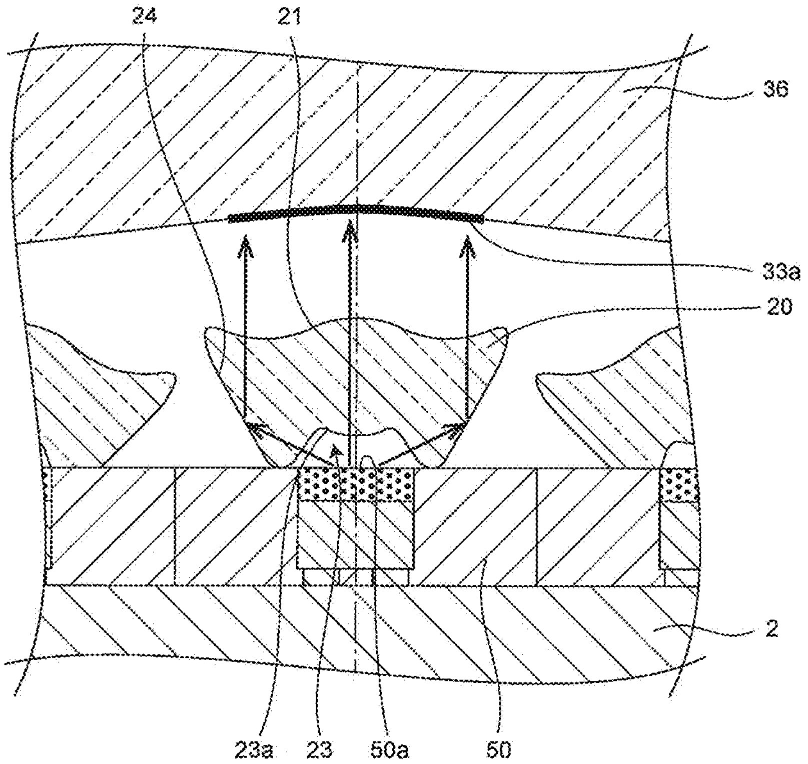
FIG. 6A is a schematic enlarged view of a portion shown in FIG. 4A, showing a state in which the light from a central light emitting part enters an optical lens through a central first unit lens.
Figure 6B:
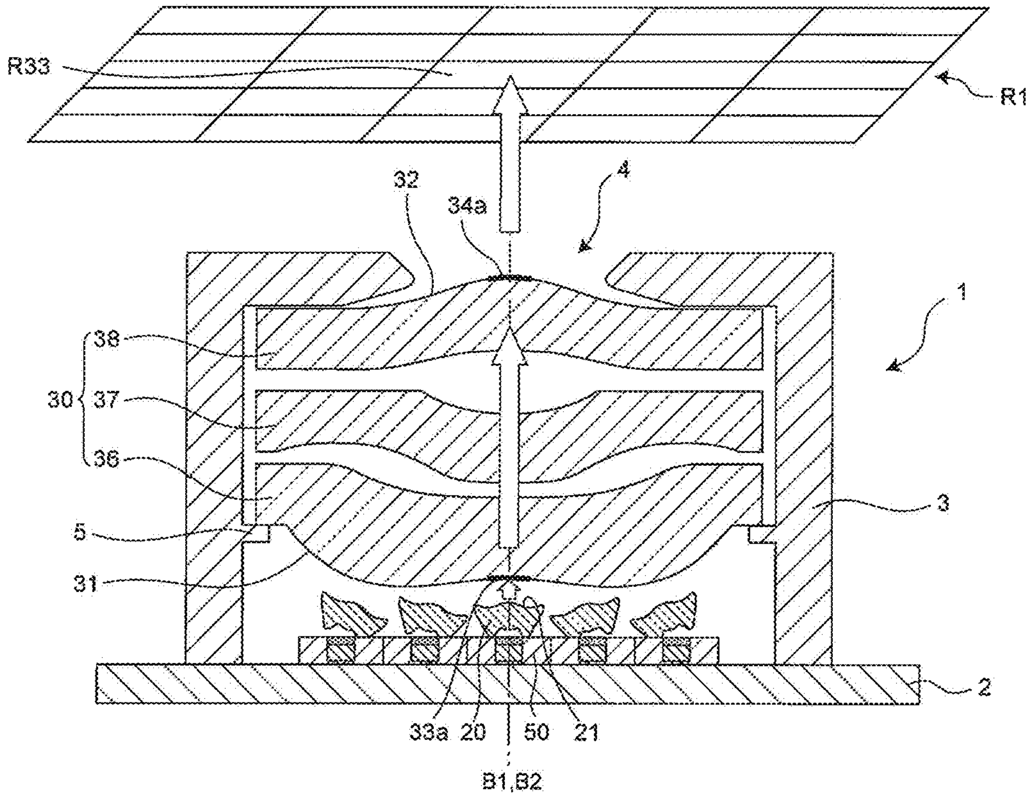
FIG. 6B schematically shows a state in which the light emitted from the central first unit lens irradiates a corresponding irradiation region through the optical lens in the cross-sectional view shown in FIG. 4A.

As shown in FIGS. 6A and 6B, the light emitted from the light emitting surface 50*a* of the central light emitting part 50 at the first full-width half-maximum θ1 mainly travels in sequence as follows:

(1) Light enters the central first unit lens 20 through an inner surface 23*a* defining a recess 23 of the central first unit lens 20 (see FIG. 6A).

(2) Subsequently, the entered light is totally reflected by an inner lateral surface 24 of the central first unit lens 20.

(3) Then, the reflected light is emitted from the upper surface 21 of the central first unit lens 20 at the second full-width half-maximum θ2.

(4) The emitted light enters the optical lens 30 through an incident region 33*a* corresponding to the central light emitting part 50 (see FIG. 6B).

(5) Then, the light is emitted from an emission region 34*a* corresponding to the incident region 33*a* toward the outside of the optical lens 30.

(6) The light emitted from the emission region 34*a* is irradiated to the irradiation region (irradiation region located directly above the central light emitting part 50) R33 corresponding to the central light emitting part 50.

The central first unit lens 20 is disposed such that its optical axis B1 is orthogonal to the light emitting surface 50*a* of the central light emitting part 50 so that light emitted from the central light emitting part 50 is irradiated to the irradiation region R33 directly above the central light emitting part 50. That is, the optical axis of the central first unit lens 20 coincides the optical axis B2 of the optical lens 30.

The shape of an incident region 33*a* (an incident region of the first optical lens 36) of the optical lens 30 that corresponds to the central light emitting part 50 and the shape of the emission region 34*a* (the emission region of the third optical lens 38) of the optical lens 30 that corresponds to the incident region 33*a* are appropriately designed so that the irradiation region R33 disposed directly above the central light emitting part 50 is irradiated with the light emitted from the central first unit lens 20.

Likewise, the shape of the emission region of the first optical lens 36 that corresponds to the central light emitting part 50, the shapes of the incident region and the emission region of the second optical lens 37, and the shape of the incident region of the third optical lens 38 are appropriately designed so that the irradiation region R33 disposed directly above the central light emitting part 50 is irradiated with the light emitted from the central first unit lens 20.

Distribution of Light Emitted from Light Emitting Part Other than Central Light Emitting Part 50

Distributions of lights emitted from light emitting parts other than the central light emitting part 50 vary according to positions of the light emitting parts, but are the same in that the light from each of these light emitting parts intersects the optical axis B2 of the optical lens 30 and is irradiated to a corresponding irradiation region.

For this reason, distribution of light emitted the light emitting part 55 (a peripheral light emitting part) disposed in the first row and third column (see FIG. 2A) will be described below as an example of the distribution of light emitted from the light emitting parts other than the central light emitting part 50.

Figure 7A:
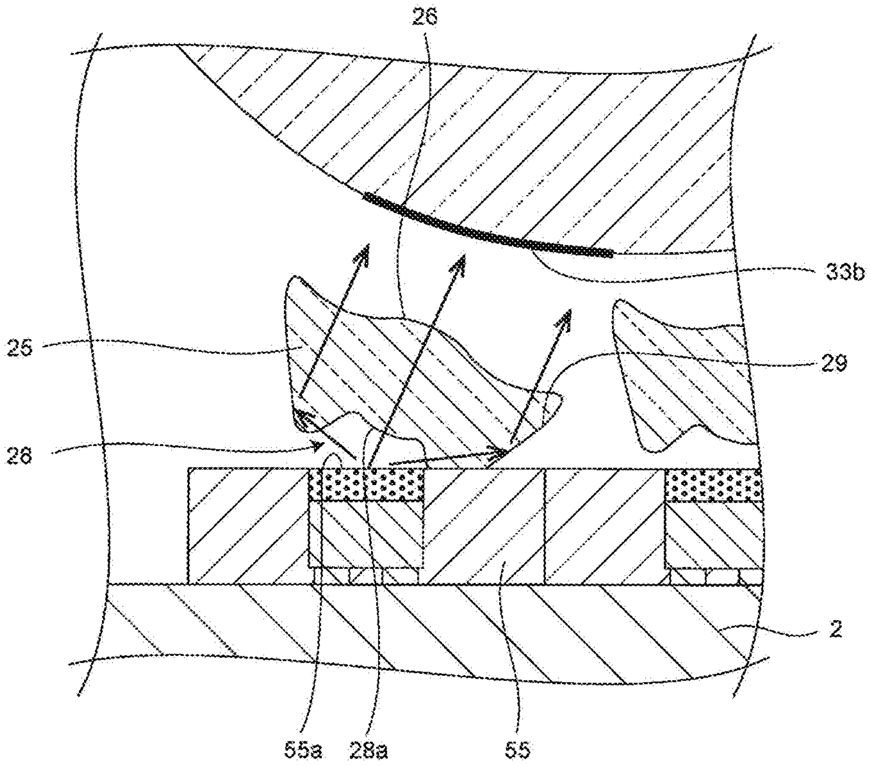
FIG. 7A is a schematic enlarged view of a portion shown in FIG. 4A, showing a state in which the light from a peripheral light emitting part enters the optical lens through a peripheral first unit lens.

As shown in FIG. 7A, light emitted from a light emitting surface 55*a* of peripheral light emitting part 55 at the first full-width half-maximum θ1 mainly travels as follows.

(1) The light emitted from the light emitting surface 55*a* enters the peripheral first unit lens 25 through an inner surface 28*a* of a recess 28 defined in the first unit lens (peripheral first unit lens) 25 that is disposed to cover the light emitting surface 55*a* of the peripheral light emitting part 55 (see FIG. 7A).

(2) Subsequently, the entered light is totally reflected at the inner lateral surface 29 of the peripheral first unit lens 25.

(3) Then, the reflected light is emitted from an upper surface 26 of the peripheral first unit lens 25 at the second full-width half-maximum θ2.

Figure 7B:
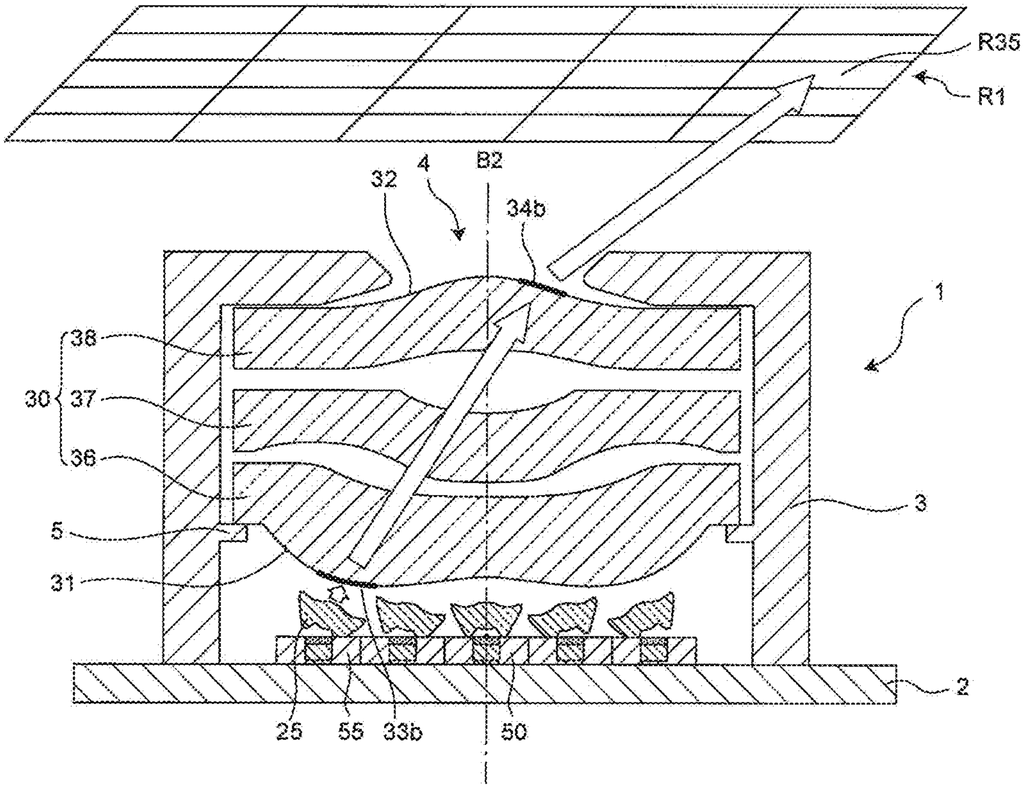
FIG. 7B schematically shows a state in which the light emitted from the peripheral first unit lens irradiates the corresponding irradiation region through the optical lens in the cross-sectional view shown in FIG. 4A.

(4) The emitted light enters the optical lens 30 through an incident region 33*b* corresponding to the peripheral light emitting part 55 (see FIG. 7B).

(5) Subsequently, the entered light intersects the optical axis B2 of the optical lens 30 within the optical lens 30.

(6) Then, the light is emitted from the emission region 34*b* corresponding to the incident region 33*b* to the outside of the optical lens 30.

(7) The light emitted from the emission region 34*b* is irradiated to an irradiation region R35 corresponding to the peripheral light emitting part 55.

The light emitted from the peripheral light emitting part 55 may intersect the optical axis B2 of the optical lens 30 at a location other than inside the optical lens 30, and can intersect the optical axis B2 of the optical lens 30 at any appropriate location between a location where the light is emitted from the peripheral light emitting part 55 to a location where the corresponding irradiation region R35 is irradiated with the light.

As described above, in the present embodiment, the twenty-five light emitting parts 41 and the irradiation regions corresponding to respective light emitting parts 41 have the point-symmetric arrangement relationship with respect to the single point O above the central light emitting part 50. Thus, the peripheral first unit lens 25 is disposed such that its optical axis B1 intersects the optical axis B2 of the optical lens 30 above the central light emitting part 50. With this arrangement, the light emitted from the light emitting part 41 through the peripheral first unit lens 25 has higher directivity toward the corresponding irradiation region R35, compared to when the peripheral first unit lens 25 is not provided.

The shape of the incident region 33*b* (the incident region of the first optical lens 36) of the optical lens 30 that corresponds to the peripheral light emitting part 55 and the shape of the emission region 34*b* (the emission region of the third optical lens 38) of the optical lens 30 are appropriately designed so that the irradiation region R35 is irradiated with the light emitted from the peripheral first unit lens 25, the irradiation region R35 being disposed at the point-symmetric position to the peripheral light emitting part 55 with respect to the single point O.

Likewise, the shape of the emission region of the first optical lens 36, the shapes of the incident region and the emission region of the second optical lens 37, and the shape of the incident region of the third optical lens 38 are appropriately designed so that the irradiation region disposed at the point-symmetric position to the peripheral first unit lens with respect to the single point O is irradiated with the light emitted from the peripheral first unit lens 25.

As described above, the light source 1 according to the present embodiment includes the first lens 10 disposed to cover the light emitting surface 41*a* of the light emitting part 41, so that a full-width half-maximum of light emitted from the light emitting surface 41*a* of each of the light emitting parts 41 is narrowed by the first lens 10 and enters the optical lens 30 after obtaining the high directivity towards the corresponding irradiation region. Thus, light emitted from the light emitting surface 41*a* of each of the light emitting parts 41 can be efficiently irradiated to a desired corresponding irradiation region.

2. Second Embodiment

Figure 8:
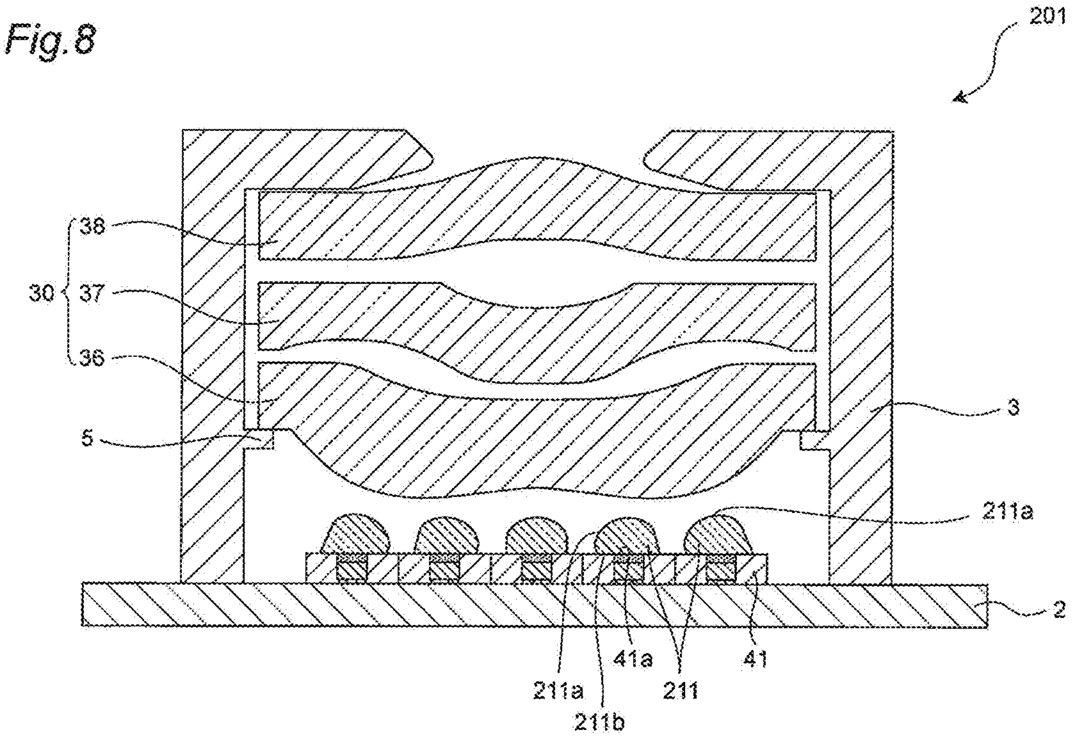
FIG. 8 is a schematic cross-sectional view of a light source for a flash according to a second embodiment of the present disclosure.

A light source 201 according to a second embodiment shown in FIG. 8 differs from the light source 1 according to the first embodiment in that the first unit lens is a lens having a single convex surface (convex surface) at an optical lens 30 side. Each of first unit lenses 211 according to the second embodiment has, for example, a semicircular cross-sectional shape with a convex surface 211*a* formed by a smooth curved surface. Each first unit lens 211 is disposed to cover the light emitting surface 41*a* of a corresponding light emitting part 41 with its lower surface 211*b*.

Each of the first unit lens 211 has such a simple shape, which allows for facilitating producing a mold or die used for forming the first unit lenses 211.

3. Third Embodiment

Figure 9:
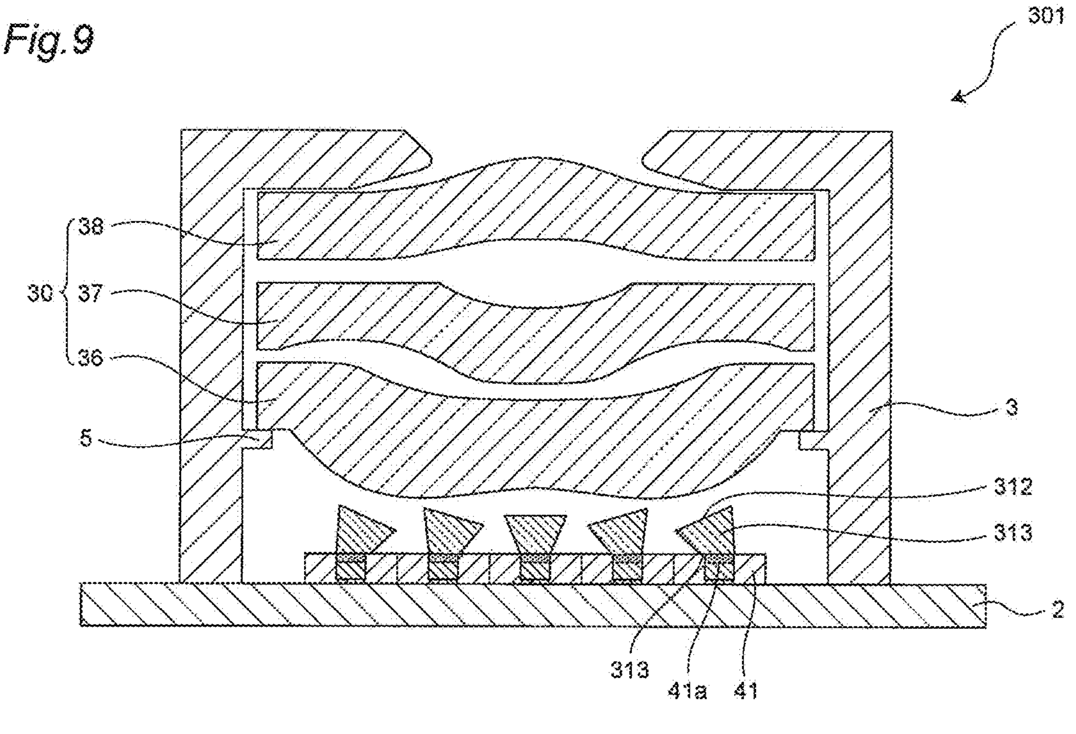
FIG. 9 is a schematic cross-sectional view of a light source for a flash according to a third embodiment of the present disclosure.

A light source 301 according to a third embodiment shown in FIG. 9 differs from the light source 1 according to the first embodiment in that the first unit lens is a frustum lens in which an area of an upper surface 312 is greater than an area of a lower surface 313. Each of first unit lenses 311 according to the third embodiment has the upper surface 312 and the lower surface 313 each of which has, for example, a circular shape, a triangular shape, a rectangular shape, etc. Each first unit lens 311 is disposed to cover the light emitting surface 41*a* of a corresponding light emitting part 41 with the lower surface 313. Each first unit lens 311 may be a lens other than a frustum lens in which the area of the upper surface 312 is greater than the area of the lower surface 313, and may be a frustum lens in which the area of the upper surface 312 is smaller than the area of the lower surface 313, or may be a columnar lens in which the area of the upper surface 312 is equal to the area of the lower surface 313. Such a first unit lens 311 can also adjust the directivity of light utilizing the reflection inside the first unit lens 311, like the total internal reflection lens described above.

Each of the first unit lenses 311 have such a simple shape, which facilitates producing a mold or die used for forming the first unit lens 311.

4. Fourth Embodiment

A light source of each of the present embodiment and fifth and sixth embodiments to be described below differs from the light source 1 according to the first embodiment in that the first lens is a lens collectively covering the light emitting surfaces 41*a* of the plurality of light emitting parts 41 and having at least a single convex surface (convex surface) at the optical lens 30 side.

Figure 10:
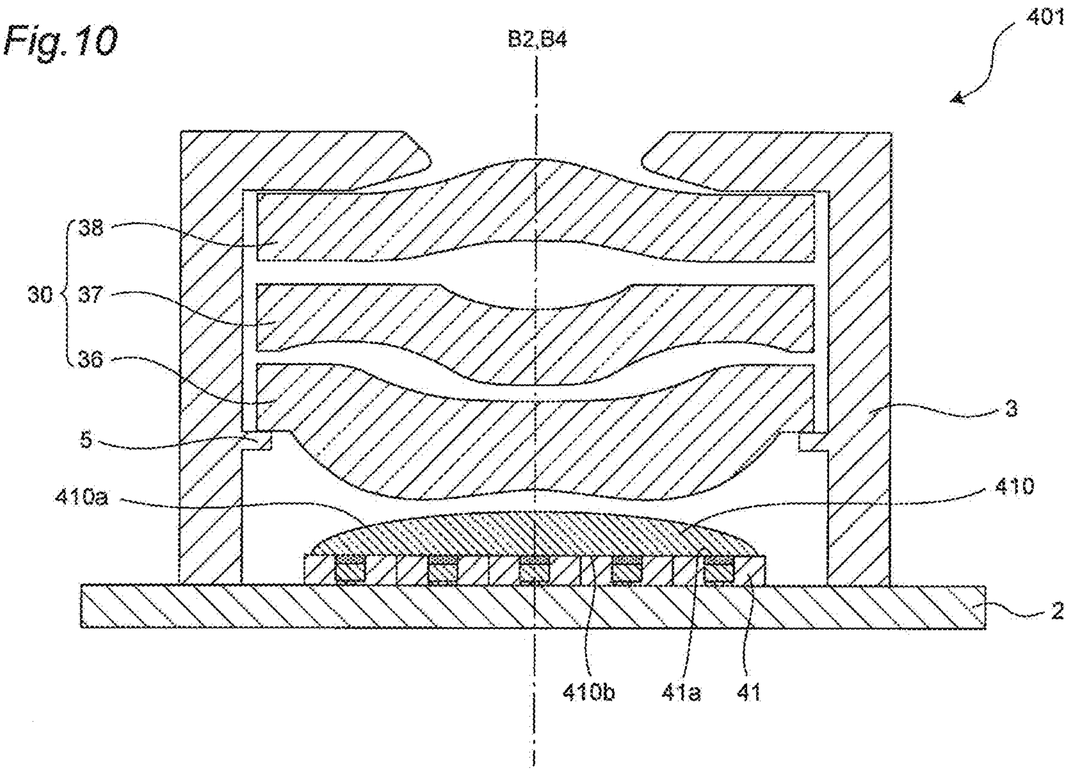
FIG. 10 is a schematic cross-sectional view of a light source for a flash according to a fourth embodiment of the present disclosure.

A first lens 410 of a light source 401 according to the present embodiment has a single convex surface (convex surface) 410*a* at the optical lens 30 side. As shown in FIG. 10, in the first lens 410, the convex surface 410*a* has an arc outline on the cross section and is formed by a smooth curved surface. The first lens 410 is disposed to collectively cover the light emitting surfaces 41*a* of all the light emitting parts 41 with its lower surface 410*b*.

The first lens 410 has such a simple shape, which allows for facilitating producing a mold or die used for forming the first lens 410. Also, with the first lens 410 having such a structure, lenses corresponding to respective light emitting parts 41 in arrangement adjusted for respective light emitting parts 41 (such as the first unit lenses 11 in the first embodiment) is not required. For example, it is sufficient to align an optical axis B4 of the first lens 410 with the optical axis B2 of the optical lens 30, which can simplify the manufacturing process.

The curvature of the convex surface 410*a* of the first lens 410 may be constant from the optical axis B4 to an end portion of the first lens 410, or may vary according to the distance from the optical axis B4. In particular, with the curvature of the convex surface 410*a* of the first lens 410 increased from the optical axis B4 to the end portion of the first lens 410, the following effects can be expected.

Among lights emitted from the light emitting parts 41 disposed near the end of the convex surface 410*a* of the first lens 410 (for example, in the present embodiment, the light emitting parts 41 disposed in the first row and the k-th column, in the fifth row and the k-th column, in the k-th row and the first column, and in the k-th row and the fifth column (k=1 to 5)), light that deviates from the direction of a desired directivity (in the present embodiment, the direction toward the irradiation region corresponding to the light emitting part 41), in particular, light traveling toward the frame 3 is unlikely to be incident on the optical lens 30. Consequently, the loss of light in this light emitting part 41 may be increased. For this reason, with the curvature of the end portion of the convex surface 410*a* of the first lens 410 greater than the curvature of the central portion of the convex surface 410*a*, among the lights emitted from the light emitting parts 41 disposed near the end portion of the convex surface 410*a*, the light traveling toward the frame 3 can be refracted in the direction of the desired directivity. This allows for reducing the loss of light of such a light emitting part 41.

5. Fifth Embodiment

Figure 11:
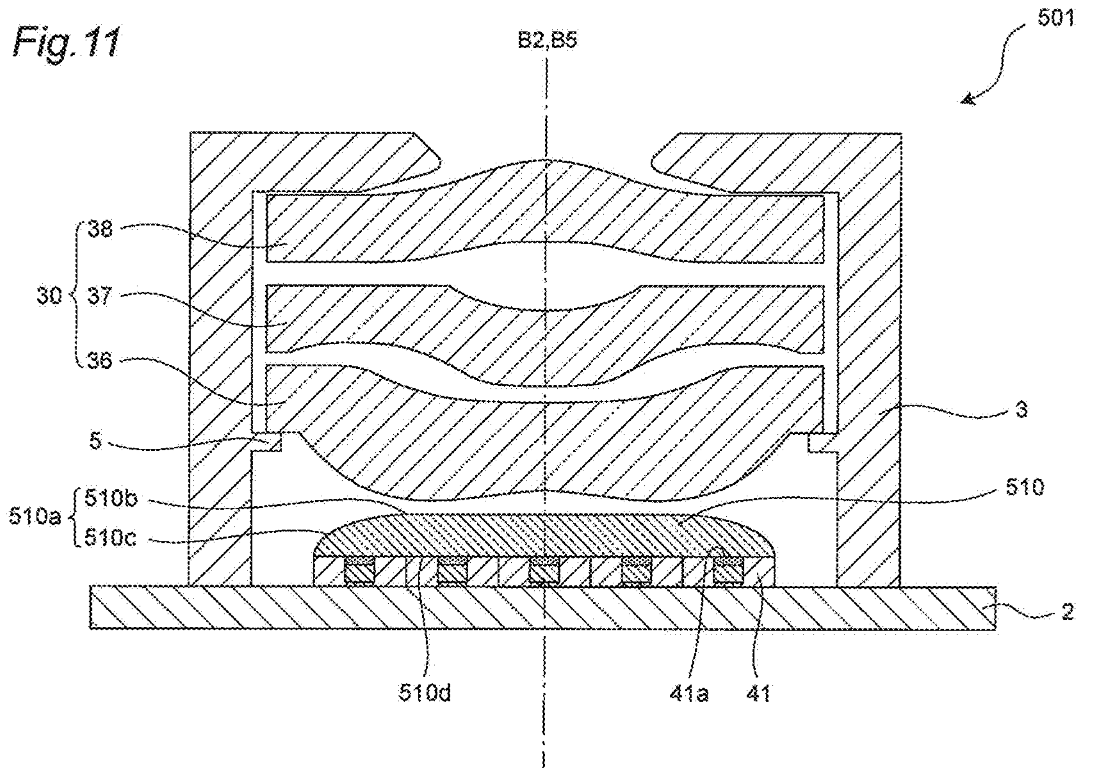
FIG. 11 is a schematic cross-sectional view of a light source for a flash according to a fifth embodiment of the present disclosure.

A first lens 510 of a light source 501 according to the present embodiment has a single convex surface (convex surface) 510*a* on the optical lens 30 side. As shown in FIG. 11, in the first lens 510, the convex surface 510*a* includes a flat surface 510*b* located in a central portion of the convex surface 510*a*, and curved surfaces 510*c*, each connecting the flat surface 510*b* and a lower surface 510*d* of the first lens 510 and being located at the end of the first lens 510.

The flat surface 510*b* is orthogonal to the optical axis B2 of the optical lens 30. Each of the curved surfaces 510*c* is curved toward the outside of the first lens 510. The first lens 510 is disposed with the lower surface 510*d* collectively covering the upper surfaces 41*a* of all the light emitting parts 41.

As described above about the light source 401 of the fourth embodiment, also in the light source 501 according to the present embodiment, increasing the curvature of the end portion side of the first lens 510 in the curved surfaces 510*c* of the first lens 510 allows light emitted from the light emitting part 41 disposed near the end portion of the first lens 510 to be refracted in the direction of the desired directivity (in the present embodiment, in the direction toward the irradiation region corresponding to the above-mentioned light emitting part 41). Therefore, the loss of light in this light emitting part 41 can be reduced. Furthermore, with the flat surface at the center portion of the convex surface 510*a* of the first lens 510, a thickness of the first lens 510 can be smaller than a first lens having a single convex curved surface across the entirety of the optical lens 30 side of the first lens, such as the light source 401 according to the fourth embodiment, so that the size of the light source reduced.

6. Sixth Embodiment

A first lens 610 of a light source 601 according to the present embodiment has a single convex surface (convex surface) 610*a* at the optical lens 30 side.

Figure 12:
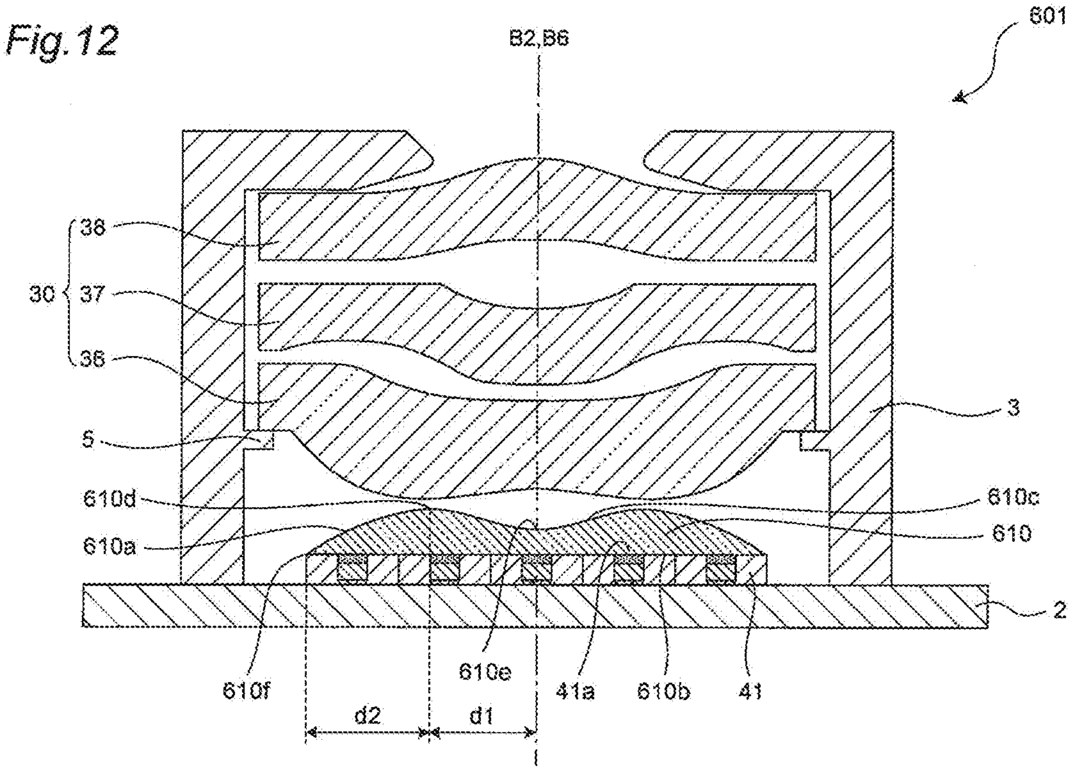
FIG. 12 is a schematic cross-sectional view of a light source for a flash according to a sixth embodiment of the present disclosure.

As shown in FIG. 12, the convex surface 610*a* is a smoothly curved surface that has a cross section formed in an annular shape with respect to the optical axis B6 of the first lens 610 centered. Therefore, in the cross-sectional shape of the first lens 610, the convex surface 610*a* has two apex portions 610*d*. Each apex portion 610*d* of the convex surface 610*a* is desirably located at a position where a distance d1 between the apex portion 610*d* of the convex surface 610*a* and the optical axis B6 of the first lens 610 is shorter than a distance d2 between the apex portion 610*d* of the convex surface 610*a* and an outer circumferential end 610*f* of the first lens 610.

The center of the first lens 610 is formed in a concave surface 610_c_ continuous to the convex surface 610_a_, and an apex portion 610_e_ of the concave surface 610_c_ is disposed on the optical axis B6 of the first lens 610. The optical axis B6 of the first lens 610 is disposed to coincide with the optical axis B2 of the optical lens 30.

An end portion of the first lens 610 (in the present embodiment, an end portion of the convex surface 610_a_ in the vicinity of the outer circumferential end 6100 preferably has a curvature greater than the curvature of the concave surface 610_c_.

The first lens 610 is disposed with a lower surface 610_b_ collectively covering the upper surfaces 41_a_ of all the light emitting parts 41.

7. Seventh Embodiment

Figure 13:
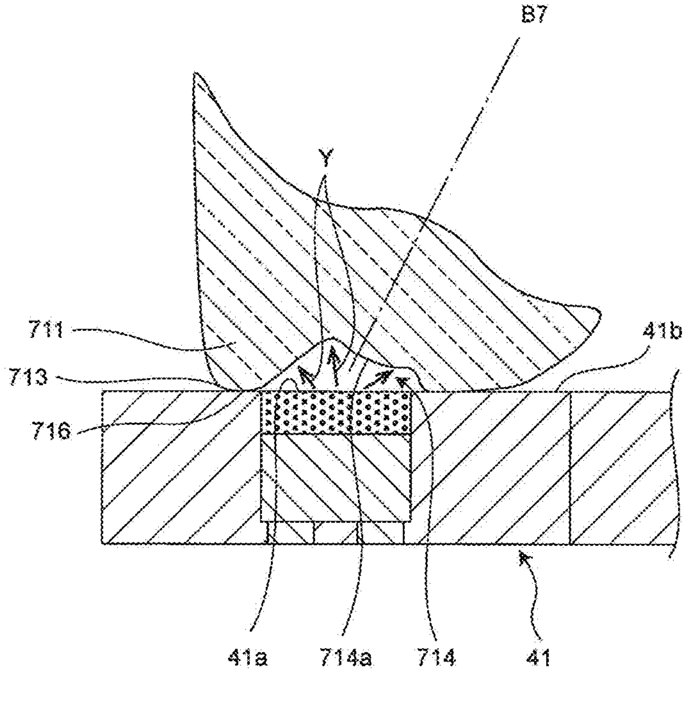
FIG. 13 is a schematic cross-sectional view of a first lens included in a light source for a flash according to a seventh embodiment of the present disclosure.

As shown in FIG. 13, a light source according to a seventh embodiment differs from the light source 1 according to the first embodiment in that the first unit lens other than the central first unit lens is the total internal reflection lens of a rotationally asymmetric shape with respect to an optical axis of the central first unit lens. A first unit lens 711 other than the central first unit lens according to the seventh embodiment is the total internal reflection lens with a rotationally asymmetric shape with respect to an optical axis B7, in which a connection portion 716 (an opening end of a recess 714), which connects a lower surface 713 and an inner surface 714_a_ that defines the recess 714 in the lower surface 713, is formed to surround the light emitting surface 41_a_ and to contact the upper surface 41_b_ of the light emitting part 41. Such a first unit lens 711 is disposed such that the inner surface 714_a_ defining the recess 714 at the light emitting surface 41_a_ side covers the light emitting surface 41_a_ of the light emitting part 41. Therefore, as indicated by the arrow Y in FIG. 13, almost all the lights emitted from the light emitting surfaces 41_a_ of the light emitting parts 41 enter corresponding ones of first unit lenses 711 through the inner surfaces 714_a_ of corresponding ones of the recesses 714 of the first unit lenses 711. This allows for increasing the efficiency of usage of the light emitted from the light emitting part 41.

The tilt angle of the first unit lens 711 with respect to the optical axis of the optical lens varies according to corresponding light emitting part in a matrix of five rows and five columns. Thus, the shape of the first unit lens 711 differs according to each light emitting part 41.

In the present embodiment, the twenty-five light emitting parts 41 and the irradiation regions corresponding to the respective light emitting parts 41 have the point-symmetric arrangement relationship with respect to the single point O above the central light emitting part 50. Therefore, the first unit lenses 711 have respective shapes as described below.

(1) The first unit lens 711 disposed in the third row and the second column and the first unit lens 711 disposed in the third row and the fourth column have the same shape (shape 1).

(2) The first unit lens 711 disposed in the second row and the third column and the first unit lens 711 disposed in the fourth row and the third column have the same shape (shape 2).

(3-1) The first unit lens 711 disposed in the second row and the second column and the first unit lens 711 disposed in the fourth row and the fourth column have the same shape (shape 3-1).

(3-2) The first unit lens 711 disposed in the second row and the fourth column and the first unit lens 711 disposed in the fourth row and the second column have the same shape (shape 3-2).

(4) The first unit lens 711 disposed in the third row and the first column and the first unit lens 711 disposed in the third row and the fifth column have the same shape (shape 4).

(5) The first unit lens 711 disposed in the first row and the third column and the first unit lens 711 disposed in the fifth row and the third column have the same shape (shape 5).

(6-1) The first unit lens 711 disposed in the second row and the first column and the first unit lens 711 disposed in the fourth row and the fifth column have the same shape (shape 6-1).

(6-2) The first unit lens 711 disposed in the second row and the fifth column and the first unit lens 711 disposed in the fourth row and the first column have the same shape (shape 6-2).

(7-1) The first unit lens 711 disposed in the first row and the second column and the first unit lens 711 disposed in the fifth row and the fourth column have the same shape (shape 7-1).

(7-2) The first unit lens 711 disposed in the first row and the fourth column and the first unit lens 711 disposed in the fifth row and the second column have the same shape (shape 7-2).

(8-1) The first unit lens 711 disposed in the first row and the first column and the first unit lens 711 disposed in the fifth row and the fifth column have the same shape (shape 8-1).

(8-2) The first unit lens 711 disposed in the first row and the fifth column and the first unit lens 711 disposed in the fifth row and the first column have the same shape (shape 8-2).

Furthermore, when the light emitting parts 41 have a square shape in a top view and have respective light emitting surfaces 41_a_ of the same dimensions, the shape 1 and the shape 2 are the same, the shape 4 and the shape 5 are the same, the shape 6-1, the shape 6-2, the shape 7-1, and the shape 7-2 are the same, the shape 3-1 and the shape 3-2 are the same shape, and the shape 8-1 and the shape 8-2 are the same.

8. Eighth Embodiment

Figure 14:
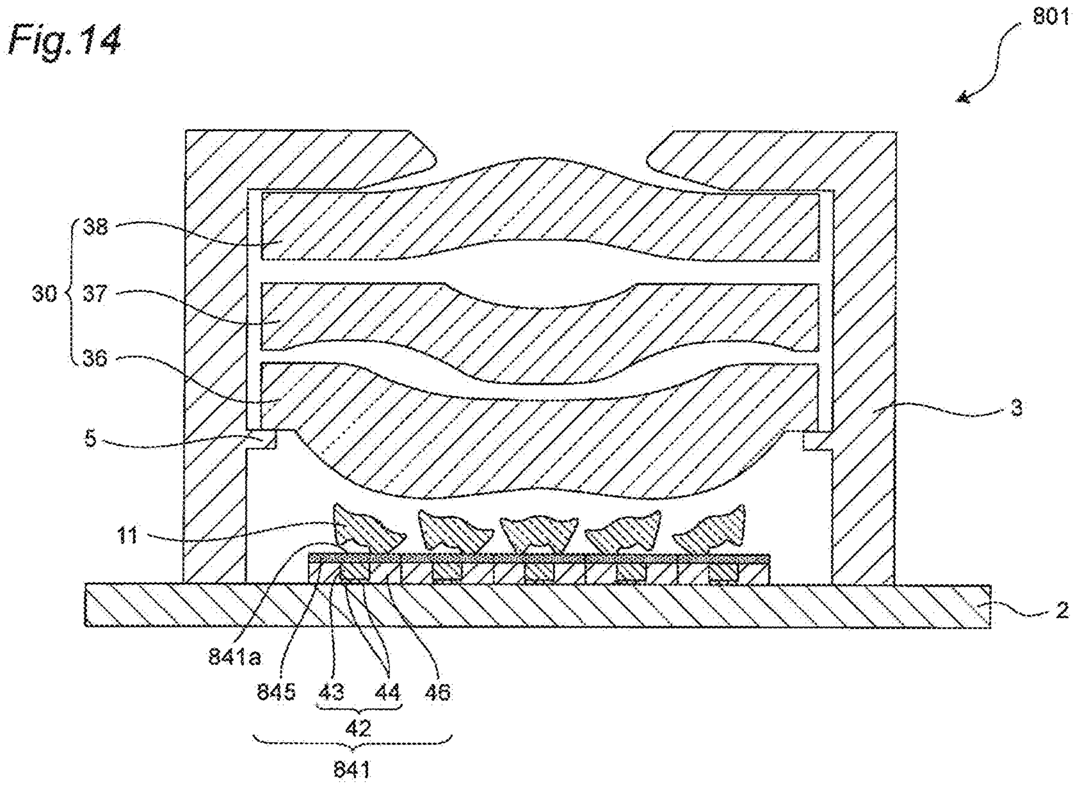
FIG. 14 is a schematic cross-sectional view of a light source for a flash according to an eighth embodiment of the present disclosure.

A light source 801 according to an eighth embodiment shown in FIG. 14 differs from the light source 1 according to the first embodiment in that the wavelength conversion member disposed in the light emitting part covers an upper surface of the light emitting element 42 and an upper surface of the light-reflective member 46. A wavelength conversion member 845 according to the eighth embodiment may be disposed such that a plurality of wavelength conversion members 845 are provided for respective light emitting parts 41, or such that a single wavelength conversion member 845 collectively covers the upper surfaces of the semiconductor layered bodies 43 and the upper surfaces of the light-reflective members 46 of all twenty-five light emitting parts 41.

The wavelength conversion member 845 is a thin member, and accordingly, when the wavelength conversion member 845 is disposed to cover the upper surface of the light emitting element 42 and the upper surface of the light-reflective member 46, a light emitting surface 841_a_ of a light emitting part 841 can be regarded as a region of the wavelength conversion member 845 located directly above the upper surface of the light emitting element 42.

VARIANT EXAMPLES

Figure 15:
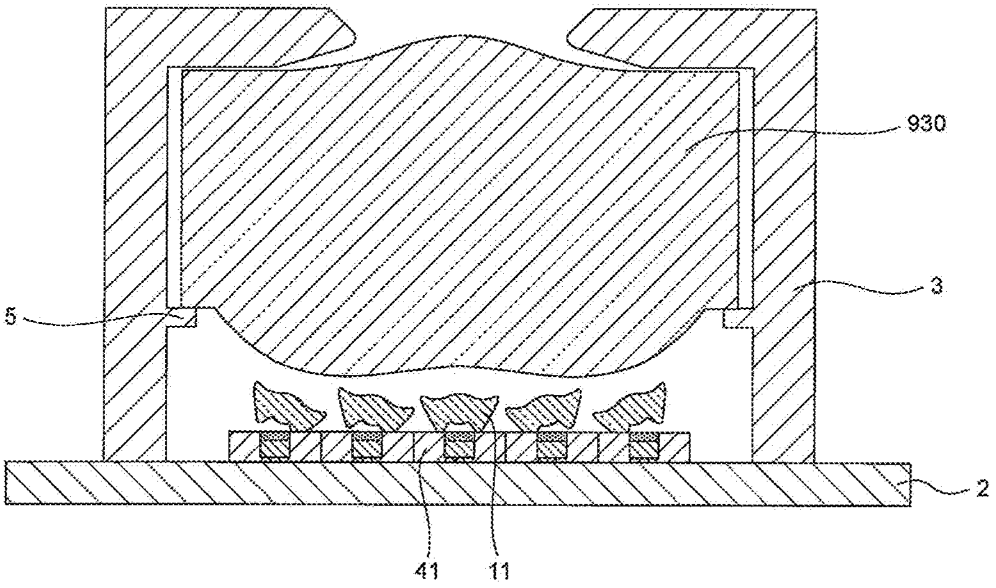
FIG. 15 is a schematic cross-sectional view of a light source for a flash according to a variant example of the present disclosure.
Figure 16:
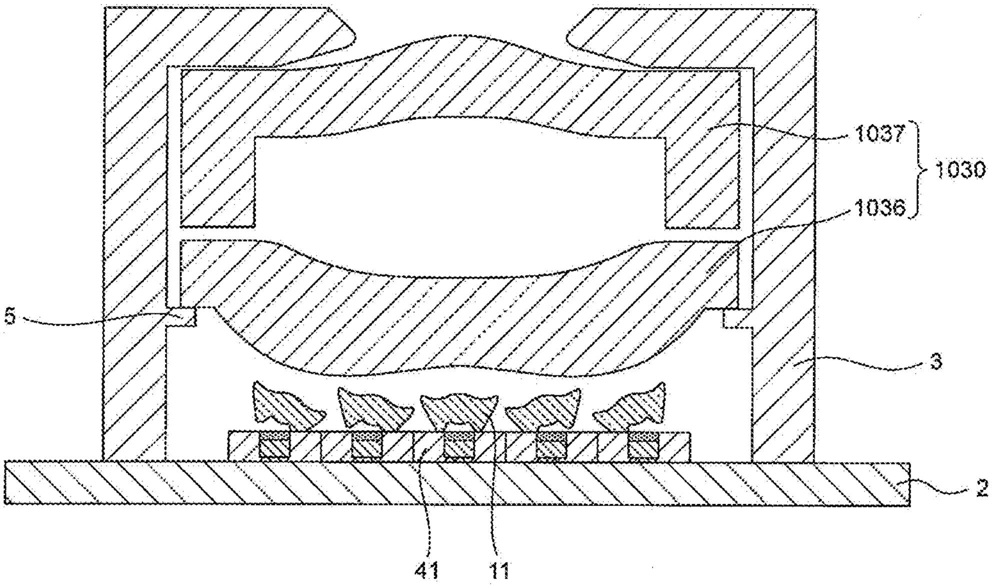
FIG. 16 is a schematic cross-sectional view of a light source for a flash according to another variant example of the present disclosure.

While the optical lens 30 is composed of three lenses, namely, the first optical lens 36, the second optical lens 37, and the third optical lens 38 in the light sources according to the above-mentioned first to eighth embodiments, the optical lens may be composed of other number of lens or lenses. For example, as shown in FIG. 15, an optical lens 930 may be composed of a single lens. For example, as shown in FIG. 16, an optical lens 1030 may be composed of two lenses, namely, a first optical lens 1036 and a second optical lens 1037. For example, an optical lens may be composed of four or more lenses.

Figure 17:
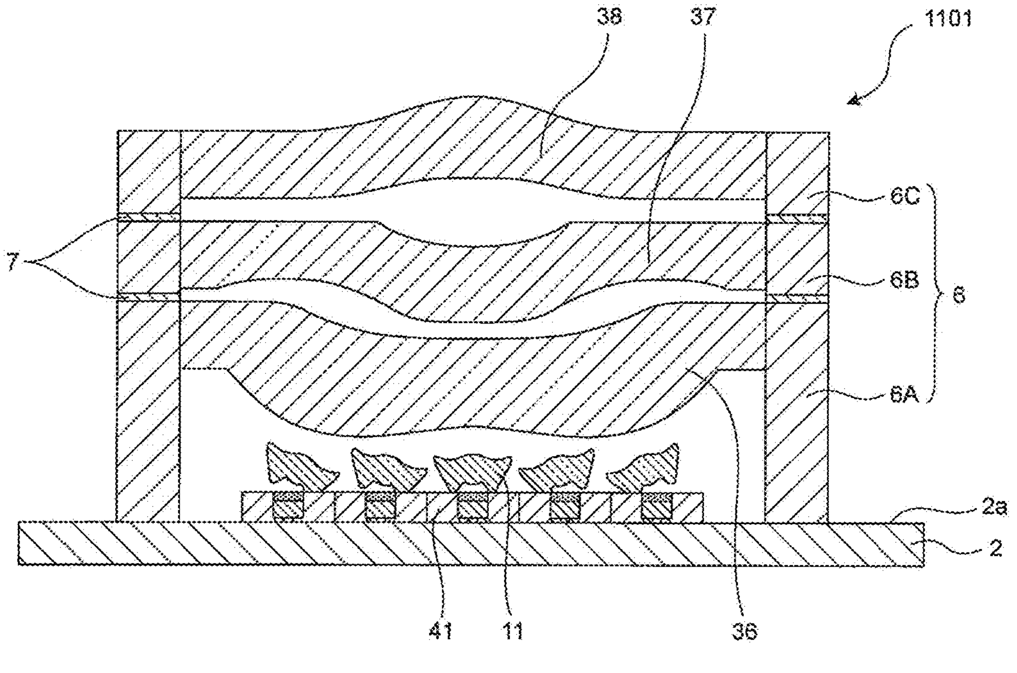
FIG. 17 is a schematic cross-sectional view of a light source for a flash according to another variant example of the present disclosure.

While the optical lens is supported using the supporting portion 5 located on the inner surface of the frame 3 the light sources according to the first to eighth embodiments and a variant example described above, the optical lens may be supported using other appropriate configuration. For example, as shown in FIG. 17, optical lenses 36, 37, and 38 may be supported by a first leg 6A, a second leg 6B, and a third leg 6C connected to the ends of the first optical lens 36, the second optical lens 37, and the third optical lens 38, respectively.

The first leg 6A extends from the end of the first optical lens 36 to the upper surface 2*a* of the substrate 2 to support the first optical lens 36. The second leg 6B extends from the end of the second optical lens 37 to the upper surface of the first leg 6A to support the second optical lens 37. The third leg 6C extends from the end of the third optical lens 38 to the upper surface of the second leg 6B to support the third optical lens 38.

The first leg 6A, the second leg 6B, and the third leg 6C may be formed of, for example, a light-reflective member or a light shielding member. The first leg 6A, the second leg 6B, and the third leg 6C may be portions of lenses formed of the same material as the first optical lens 36, the second optical lens 37, and the third optical lens 38, respectively. In this case, a joint member 7 joining adjacent ones of the first to third legs 6A, 6B, and 6C may be formed of, for example, an adhesive or the like.

The first leg 6A, the second leg 6B, and the third leg 6C may be composed of a single monolithic member.

In a case in which each optical lens is supported by a leg connected to the end of each optical lens in this way, the light source may not include a frame.

EXAMPLES

Examples will be described below.

In Examples, simulation of illuminance distribution in the irradiation region was conducted using a light source model based on the light source for a flash according to the first embodiment. The light source model included a substrate, twenty-five light emitting parts configured to be individually turned on, a first lens including twenty-five first unit lenses corresponding to respective light emitting parts, an optical lens disposed above the first lens, and a frame accommodating the light emitting parts, the first lens, and the optical lens, and having an opening in an upper surface of the frame.

The twenty-five light emitting parts were set to be arranged in a matrix of five rows and five columns with their adjacent lateral surfaces being in contact with each other. Each light emitting part was set to have a square shape in the top view with each side of 1.13 mm. The light emitting surface of each light emitting part was set to have a square shape with each side of 0.24 mm.

The irradiated regions were set to be arranged in a matrix of five rows and five columns each corresponding to a respective one of twenty-five light emitting parts. Each irradiation region was set to be a rectangular plane with a short side of 280 mm and a long side of 370 mm with reference to an angle of view and the aspect ratio of a camera, and the twenty-five irradiation regions are assumed to be arranged adjacent to each other in the same plane.

The distance between the midpoint of the irradiation region in the third row and the third column and the midpoint of the central light emitting part in the third row and the third column was set at 30 cm.

The optical lens was a lens composed of three lenses, namely, the first optical lens, the second optical lens, and the third optical lens. The refractive index of each of the first optical lens, the second optical lens, and the third optical lens was set at 1.58. The optical lens was set to be oriented such that an optical axis of the optical lens was orthogonal to the light emitting surface of the central light emitting part.

First unit lenses disposed were also arranged in a matrix of five rows and five columns corresponding to the light emitting parts. The refractive index of the first unit lens was set at 1.58.

The central first unit lens disposed in the third row and the third column was set to be oriented such that an optical axis of the central first unit lens coincided the optical axis of the optical lens.

The first unit lens disposed in the second row and the third column, the first unit lens disposed in the third row and the second column, the first unit lens disposed in the third row and the fourth column, and the first unit lens disposed in the fourth row and the second column were set such that their respective optical axes were tilted by 15° with respect to the optical axis of the optical lens. That is, the first angle and the second angle were set at 15°.

The first unit lens disposed in the second row and the second column, the first unit lens disposed in the second row and the fourth column, the first unit lens disposed in the fourth row and the second column, and the first unit lens disposed in the fourth row and the fourth column were set such that their respective optical axes were tilted by 22° with respect to the optical axis of the optical lens. That is, the third angle were set at 22°.

The first unit lens disposed in the first row and the third column, the first unit lens disposed in the third row and the first column, the first unit lens disposed in the third row and the fifth column, and the first unit lens disposed in the fifth row and the third column were set such that their respective optical axes were tilted by 27° with respect to the optical axis of the optical lens. That is, the fourth angle and the fifth angle were set at 27°.

The first unit lens disposed in the first row and the second column, the first unit lens disposed in the first row and the fourth column, the first unit lens disposed in the second row and the first column, the first unit lens disposed in the second row and the fifth column, the first unit lens disposed in the fourth row and the first column, the first unit lens disposed in the fourth row and the fifth column, the first unit lens disposed in the fifth row and the second column, and the first unit lens disposed in the fifth row and the fourth column were set such that their respective optical axes were tilted by 30.5° with respect to the optical axis of the optical lens. That is, the sixth angle and the seventh angle were set at 30°.

The first unit lens in the first row and the first column, the first unit lens in the first row and the fifth column, the first unit lens in the fifth row and the first column, and the first unit lens in the fifth row and the fifth column were set such that their respective optical axes were tilted by 35° with respect to the optical axis of the optical lens. That is, the eighth angle was set at 35°.

The air was set to be disposed in a space in contact with the first unit lens and the optical lens. The refractive index of the air was set at 1.

In consideration of the settings described above, the shapes of the first and second surfaces of the optical lens and the shape of the first unit lens were set appropriately to irradiate at least one irradiation region with light emitted from corresponding at least one light emitting part.

Figure 18:
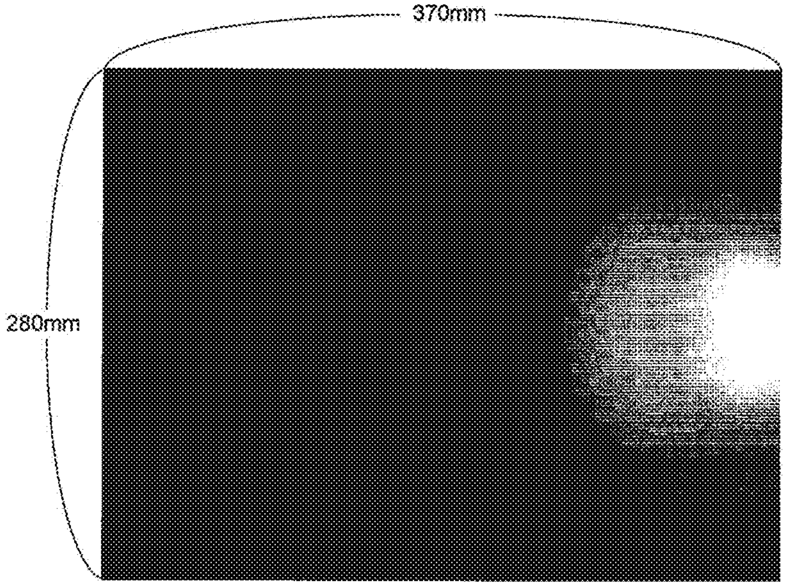
FIG. 18 is a diagram schematically showing a lighting situation in which a light emitting part in the third row and first column is turned on in the light source for a flash according to the first embodiment of the present disclosure.

In the light source model of Examples having a configuration as described above, the light emitting part in the third row and the first column was turned on, and the illuminance distribution in the corresponding irradiation region was confirmed. The simulation result is shown in FIG. 18. In Examples, the ratio of the amount of light with which the irradiation region was irradiated to the amount of light emitted from the light emitting part (the efficiency of usage of the light) was 24%.

Comparative Example

Next, Comparative Example will be described.

A light source model of Comparative Example had the same configuration as the light source according to Example with the same setting conditions for members described above, except that the first lens is not provided.

Figure 19:
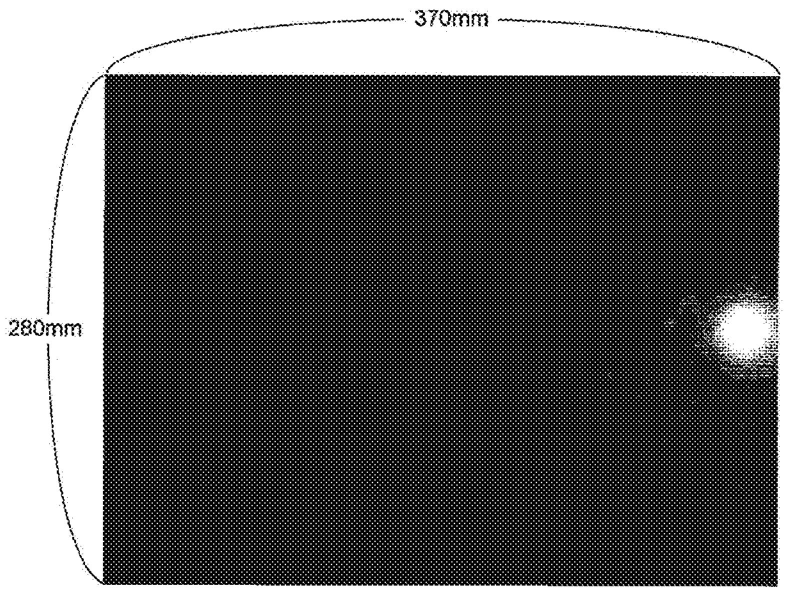
FIG. 19 is a diagram schematically showing a lighting situation in which a light emitting part in the third row and first column is turned on in a light source that has the same configuration as the light source for a flash according to the first embodiment of the present disclosure except that it does not have the first lens.

In the light source model of Comparative Example, the light emitting part in the third row and the first column was turned on, and the illuminance distribution in the corresponding irradiation region was confirmed. The simulation result is shown in FIG. 19. In Comparative Example, the ratio of the amount of light with which the irradiation region was irradiated to the amount of light emitted from the light emitting part (the efficiency of usage of the light) was 6.0%.

From the simulation results described above, it can be understood that the light source model of Examples enables irradiation of the desired region with a sufficient amount of light, compared to the light source model of Comparative Example.

While certain embodiments, variant examples, and Examples of the present disclosure have been described above, the contents of the disclosure may be modified regarding the details of components, and combinations of elements, changes in order, and the like in the embodiments, variant examples, and Examples may be realized without departing from the scope and idea of the present invention.

The light source device according to certain embodiments of the present invention can irradiate light to desired irradiation region, and thus can be preferably used for lights, camera flashes, car headlights, etc. It is noted that the applications of the light source device of the present invention are not limited thereto.

What is claimed is:

1. A light source device comprising:

a plurality of light emitting parts arranged in a matrix, each having an upper surface that comprises a light emitting surface, each of the light emitting parts being configured to emit light from the light emitting surfaces and at least one of the light emitting parts being configured to be individually turned on, wherein:

each of the light emitting parts comprises:

a light emitting element, a wavelength conversion member covering the upper surface of the light emitting element, and a light-reflective member covering lateral surfaces of the light emitting element and lateral surfaces of the wavelength conversion member, and the light-reflective members of the light-emitting parts are directly adjacent to each other; and an optical lens located above the light emitting surfaces of the light emitting parts, the optical lens comprising:

a first surface comprising a plurality of incident regions, and a second surface comprising a plurality of emission regions, wherein:

the light emitted from each of the light emitting parts enters the optical lens, such that lights emitted from two or more of the light emitting parts are irradiated to two or more corresponding irradiation regions; wherein:

sizes of the light emitting surfaces of at least some of the light emitting parts are different from each other.

2. The light source device according to claim 1, wherein:

the plurality of light emitting parts include a central light emitting part located at a center of the matrix, and four corner light emitting parts located at four respective corners of the matrix, and a size of the light emitting surface of the central light emitting part is larger than a size of the light emitting surface of each of the four corner light emitting parts.

3. The light source device according to claim 1, wherein:

the plurality of light emitting parts include a central light emitting part located at a center of the matrix, and four corner light emitting parts located at four respective corners of the matrix, and a size of the light emitting surface of the central light emitting part is smaller than a size of the light emitting surface of each of the four corner light emitting parts.

4. The light source device according to claim 1, wherein:

each of the plurality of light emitting parts and each respective one of the irradiation regions that is configured to be irradiated with a light emitted from the respective light emitting part have a point-symmetric arrangement relationship with respect to a single point.

5. The light source device according to claim 4, wherein:

the plurality of light emitting parts and their respective irradiation regions are in the point-symmetric arrangement relationship with respect to the same single point.

6. The light source device according to claim 1, wherein:

each of the incident regions of the optical lens comprises:

a first incident region on which a light emitted from a corresponding light emitting part of the plurality of light emitting parts is incident, and a second incident region on which a light emitted from an adjacent light emitting portion adjacent to the corresponding light emitting part and a light emitted from the corresponding light emitting part are incident.

7. The light source device according to claim 1, wherein:

each of the emission regions of the optical lens comprises:

a first emission region from which a light entered the optical lens through a corresponding one of the plurality of incident regions is emitted, and a second emission region from which a light entered the optical lens through an adjacent one of the plurality of incident regions that is adjacent to the corresponding incident region and a light entering the optical lens through the corresponding incident region are emitted.

8. The light source device according to claim 1, wherein: each light emitting part comprises a wavelength conversion member having an upper surface, and the upper surface of the wavelength conversion member serves as the light emitting surface of the light emitting part.

9. The light source device according to claim 1, further comprising:

a substrate having an upper surface on which the plurality of light emitting parts are disposed; and a frame disposed on the upper surface of the substrate, the frame accommodating the plurality of light emitting parts and the optical lens, wherein:

a height between the upper surface of the substrate and a top surface of the frame ranges from 2.0 mm to 10.0 mm.

10. The light source device according to claim 1, wherein: lights emitted from the plurality of light emitting parts intersect the optical axis of the optical lens or pass through the optical axis of the optical lens and then are irradiated to the irradiation regions.

11. A camera flash comprising the light source device according to claim 1.

12. The light source device according to claim 1, wherein the plurality of light emitting parts are arranged in a matrix of five rows and five columns.

13. A smartphone comprising the light source device according to claim 1.

14. A car headlight comprising the light source device according to claim 1.

* * * * *